US008195399B2

(12) United States Patent
Gladkikh et al.

(10) Patent No.: US 8,195,399 B2
(45) Date of Patent: Jun. 5, 2012

(54) METHOD OF DETERMINING DOWNHOLE FORMATION GRAIN SIZE DISTRIBUTION USING ACOUSTIC AND NMR LOGGING DATA

(75) Inventors: Mikhail N. Gladkikh, The Woodlands, TX (US); Songhua Chen, Katy, TX (US); Jiansheng Chen, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 443 days.

(21) Appl. No.: 12/053,988

(22) Filed: Mar. 24, 2008

(65) Prior Publication Data

US 2008/0221800 A1 Sep. 11, 2008

Related U.S. Application Data

(63) Continuation of application No. 11/445,023, filed on Jun. 1, 2006, now Pat. No. 7,363,161, which is a continuation-in-part of application No. 11/147,063, filed on Jun. 3, 2005, now Pat. No. 7,257,490, which is a continuation-in-part of application No. 11/146,886, filed on Jun. 3, 2005, now Pat. No. 7,356,413.

(60) Provisional application No. 60/782,076, filed on Mar. 14, 2006.

(51) Int. Cl.
*G01V 1/40* (2006.01)
*G01V 3/38* (2006.01)

(52) U.S. Cl. ................ 702/7; 702/11; 324/303

(58) Field of Classification Search .................. 702/6–8, 702/11–13; 324/303
See application file for complete search history.

(56) References Cited

U.S. PATENT DOCUMENTS

| | | | |
|---|---|---|---|
| 3,321,625 A | 5/1967 | Wahl | |
| 4,271,356 A | 6/1981 | Groeschel et al. | |
| 4,953,399 A | 9/1990 | Fertl et al. | |
| 5,303,775 A | 4/1994 | Michaels et al. | |
| 5,452,761 A | 9/1995 | Beard et al. | |
| 6,008,645 A * | 12/1999 | Bowers et al. | 324/303 |
| 6,088,656 A | 7/2000 | Ramakrishnan et al. | |
| 6,157,893 A | 12/2000 | Berger et al. | |
| 6,557,632 B2 | 5/2003 | Cernosek | |
| 7,082,994 B2 | 8/2006 | Frost, Jr. et al. | |
| 7,133,777 B2 * | 11/2006 | Goswami et al. | 702/6 |
| 7,257,490 B2 | 8/2007 | Georgi et al. | |
| 2002/0173915 A1 | 11/2002 | Egermann et al. | |
| 2003/0057947 A1 | 3/2003 | Ni et al. | |

(Continued)

OTHER PUBLICATIONS

Valvatne et al.; Predictive Pore-Scale Network Modeling, SPE 84550, SPE Annual Technical Conference and Exhibition, Oct. 5-8, 2003, pp. 1-12.

(Continued)

*Primary Examiner* — Manuel L Barbee
(74) *Attorney, Agent, or Firm* — Mossman Kumar & Tyler PC

(57) ABSTRACT

The grain size distribution of a pore-scale geometric model of a clastic earth formation are adjusted so that the NMR relaxation time distribution output of the model matches a measured NMR distribution, and an acoustic velocity output of the model matches a measured acoustic velocity (compressional and/or shear). Fluid drainage and imbibing can be simulated. Additional properties of the earth formation are predicted using the pore-scale model. The additional properties may be based on additional measurements of properties of a fluid in the formation.

20 Claims, 18 Drawing Sheets

U.S. PATENT DOCUMENTS

| | | |
|---|---|---|
| 2003/0094946 A1 | 5/2003 | Galford et al. |
| 2003/0225521 A1 | 12/2003 | Panga et al. |
| 2003/0226663 A1 | 12/2003 | Krueger et al. |
| 2005/0178189 A1 | 8/2005 | Lenormand et al. |
| 2005/0206378 A1 | 9/2005 | Hamdan et al. |

OTHER PUBLICATIONS

Bryant et al.; Prediction of elastic-wave velocities in sandstones using structural models, Geophysics, vol. 60, No. 2, (Mar.-Apr. 1995), pp. 437-446.

Gassmann, Elastic Waves Through a Packing of Spheres, Geophysics, vol. 16, Issue 4, Oct. 1951, pp. 673-685.

Toumelin et al.; A Numerical Assessment of Modern Borehole NMR Interpretation Techniques, SPE 90539, SPE Annual Technical Conference and Exhibition, Sep. 26-29, 2004, pp. 1-19.

Gladkikh et al.; Mechanistic Prediction of Capillary Imbibition Curves, SPE 90333, SPE Annual Technical Conference and Exhibition, Sep. 26-29, 2004, pp. 1-7.

Lecture notes: Chapter 3, Hydrostatic Fluid Distribution, CENG 571, Rice University, Spring, 2004, pp. 3-1-3-16.

Lecture notes: Chapter 5, Multiphase Pore Fluid Distribution, CENG 571, Rice University, Spring 2004, pp. 5-1-5-20.

Swanson; A Simple Correlation Between Permeabilities and Mercury Capillary Pressures, Journal of Petroleum Technology, Dec. 1981, pp. 2498-2504.

Bryant et al.; Network Model Evaluation of Permeability and Spatial Correlation in a Real Random Sphere Packing, Transport in Porous Medial 11: 1993, pp. 53-70.

Bryant et al.; Quantification of Spatial Correlation in Porous Media and Its Effect on Mercury Porosimetry, Journal of Colloid and Interface Science 177, (1996), pp. 88-100.

Bryant et al.; Prediction of relative permeability in simple porous media, Physical Review A, vol. 46, No. 4, Aug. 15, 1992, pp. 2004-2011.

Blunt et al.; Detailed physics, predictive capabilities and macroscopic consequences for pore-network models of multiphase flow, Elsevier, Advances in Water Resources 25 (2002), pp. 1069-1089.

A.M. Egwuenu et al., Fluid Characterization for Miscible Gas Floods, SPE 94034, SPE Europec/EAGE Annual Conference, Madrid, Spain, Jun. 13-19, 2005, pp. 1-12.

M. V. Rosenberg, How much does salt obstruct the subsalt image?, SEG 2000 Expanded Abstracts, pp. 1-4.

D. Bevc et al., Subsalt Imaging with Converted Waves, SEG 2000 Expanded Abstracts, pp. 1-4.

W. S. Leaney et al., Sub-salt velocity prediction with a look-ahead AVO walkaway, SEG Int'l Exposition and 74th Annual Meeting, Oct. 10-15, 2004, pp. 1-3.

R. R. Kendall et al., Subsalt imaging using prestack depth migration of converted waves: Mahogany Field, Gulf of Mexico, 1998 SEG Expanded Abstracts, pp. 1-4.

J. Pan et al., Depth Imaging and Regional Exploration in Northeast Garden Banks, Gulf of Mexico, SEG 2005 Annual Meeting, pp. 460-463.

M. B. Oyeneyin et al., Intelligent Sand Management, SPE 98818, 29th Annual SPE International Technical Conference and Exhibition in Abuja, Nigeria, Aug. 1-3, 2005, pp. 1-12.

A. Nouri et al., Sand-Production Prediction: A New Set of Criteria for Modeling Based on Large-Scale Transient Experiments and Numerical Investigation, Jun. 2006 SPE Journal, pp. 227-237.

M. Altunbay et al., Numerical Geology: Predicting Depositional and Diagenetic Facies From Wireline Logs Using Core Data, SPE 28794, SPE Asia Pacific Oil & Gas Conference, Melbourne, Australia, Nov. 7-10, 1994, pp. 507-515.

J. E. Brooks et al., Effect of Sand-Grain Size on Perforator Performance, SPE 39457, 1998 SPE International Symposium on Formation Damage Control, Lafayette, Louisiana, Feb. 18-19, 1998, pp. 371-379.

J. Chen et al., Determination of Grain Size Distribution From NMR Relaxation Time Using Pore Scale Modeling, SCA2007-49, International Symposium of the Society of Core Analysts, Calgary Canada, Sep. 10-12, 2007, pp. 1-6.

K. R. Brownstein et al., Importance of classical diffusion in NMR studies of water in biological cells, Physical Review A, vol. 19, No. 6, Jun. 1979, 1979 The American Physical Society, pp. 2446-2453.

D. C. Beard et al., Influence of Texture on Porosity and Permeability of Unconsolidated Sand, The American Association of Petroleum Geologists Bulletin, V. 57, No. 2 (Feb. 1973), pp. 349-369.

S. Bryant et al., Prediction of elastic-wave velocities in sandstones using structural models, Geophysics, vol. 60, No. 2 (Mar.-Apr. 1995), pp. 437-446.

G. M. Kondolf et al., Weibull vs. Lognormal Distributions for Fluvial Gravels, Journal of Sedimentary Research, vol. 70, No. 3, May 2000, pp. 456-460.

B. Purkait, Grain-size distribution patterns of a point bar system in the Usri River, India, Earth Surf. Process. Landforms 31, (2006), pp. 682-702.

K. H. Wyrwoll et al., On Using the Log-Hyperbolic Distribution to Describe the Textural Characteristics of Eolian Sediments, Journal of Sedimentary Petrology, vol. 55, No. 4, Jul. 1985, pp. 0471-0478.

\* cited by examiner

METHOD OF DETERMINING DOWNHOLE FORMATION GRAIN SIZE DISTRIBUTION USING ACOUSTIC AND NMR LOGGING DATA

CROSS-REFERENCES TO RELATED APPLICATIONS

This application is a continuation of U.S. Patent application Ser. No. 11/445,023, now U.S. Pat. No. 7,363,161, which claimed priority from U.S. Provisional Patent Application Ser. No. 60/782,076 filed on 14 Mar. 2006, and was a continuation-in-part of U.S. patent application Ser. No. 11/147,063 filed on 3 Jun. 2005, now U.S. Pat. No. 7,257,490 and U.S. Patent application Ser. No. 11/146,886 filed on 3 Jun. 2005, now U.S. Pat. No. 7,356,413.

FIELD OF THE INVENTION

The invention is related generally to methods of interpretation of properties of subterranean earth formations using measurements made by a formation evaluation sensor or sensors. Specifically, the invention is directed towards the use of modeling methods that enable the prediction of properties that are not measured by the formation evaluation sensor or sensors.

BACKGROUND OF THE ART

Oil or gas wells are often surveyed to determine one or more geological, petrophysical, geophysical, and well production properties ("parameters of interest") using electronic measuring instruments conveyed into the borehole by an umbilical such as a cable, a wireline, slickline, drill pipe or coiled tubing. Tools adapted to perform such surveys are commonly referred to as formation evaluation (FE) tools. These tools use electrical, acoustical, nuclear and/or magnetic energy to stimulate the formations and fluids within the borehole and measure the response of the formations and fluids. The measurements made by downhole instruments are transmitted back to the surface.

In order to reduce the amount of rig time needed for wireline logging, it is common practice to run multiple sensors in a single run. FOCUS™, from Baker Atlas Inc., is a high efficiency premium open hole logging system. All of the downhole instruments have been redesigned, incorporating advanced downhole sensor technology, into shorter, lighter, more reliable logging instruments, capable of providing formation evaluation measurements with the same precision and accuracy as the industry's highest quality sensors, at much higher logging speeds. Logging speeds are up to twice the speed of conventional triple-combo and quad combo logging tool strings. Speeds of up to 3600 ft/hr (1080 m/min) are possible. The logging system may include four standard major open-hole measurements (resistivity, density, neutron, acoustic) plus auxiliary services.

Some petrophysical properties are easily obtained from downhole FE measurements. These include porosity, bulk density, NMR relaxation $T_1$ and $T_2$ spectra, and compressional and shear wave velocities. Other petrophysical properties that are of importance in reservoir evaluation and development are difficult if not impossible to measure. Properties that are difficult or impossible to measure include, for example permeability, relative permeability, resistivity formation factor, capillary pressure, and NMR surface relaxivity. These are typically derived from correlations or petrophysical relationships.

One of the problems with relating the different petrophysical properties of an earth formation to each other is that they are all macroscopically measured quantities that depend ultimately on the microscopic arrangement of the constituents of the earth formation. An early attempt at predicting macroscopic properties based on microscopic models is due to Gassmann (1951) in which the earth formation is modeled as a hexagonal close packing of equal-sized elastic spheres. Based on this simplistic model, it is possible to predict the stress dependence of the packing in terms of the moduli of the constituent spheres.

The earth, of course, is not made out of a hexagonal close packing of equal-size elastic spheres. Finney (1968) measured the spatial coordinates of some 8000 spheres in a random packing of spheres, thereby completely determining the geometry of the microstructure of the packing. This packing may be regarded as a physical model of a clean sediment of well-sorted sand grains. The term "sorting" refers to the distribution of grain sizes: a poorly sorted sandstone has a large range of grain sizes while a well sorted sandstone has grains of substantially the same size. Such sediments can be deposited in a wide spectrum of depositional environments, from nonmarine to basinal deep water. The model developed by Finney is primarily applicable to earth formations comprised of compacted clastic sediments. The term "clastic" refers to rocks made up of fragments of preexisting rocks. Based on the model of Finney, there have been numerous papers that discuss the prediction of formation properties. For example, Bryant and Raikes (1995) used the central core of 3367 spheres in Finney's pack, which has a porosity of 36.2% to try to predict elastic wave velocities in sandstones. In Toumelin et al. (2004), the NMR response of porous rocks was simulated using a continuous, three-dimensional (3D) random-walk algorithm. Diffusion pathways of individual fluid molecules are determined within the 3-D porous model. The method of Toumelin allows the rigorous treatment of $T_1$ and $T_2$ relaxation times with a minimum of assumptions and for arbitrary pulse sequences. Toumelin also discusses the numerical accuracy of the simulation. The results reproduce NMR decay and build-up while accounting for restricted diffusion in porous media, fluid wettabilities, and fluid spatial distributions.

U.S. patent application Ser. No. 11/146,886, now U.S. patent Ser. No. 7,356,413 to Georgi and having the same assignee as the present disclosure discloses adjusting parameters of a pore-scale geometric model of a clastic earth formation so that the output of the model matches measurements made on a core sample. Additional properties of the earth formation are predicted using the pore-scale model. The additional properties may be based on additional measurements of properties of a fluid in the formation.

U.S. Pat. No. 7,257,490 to Georgi et al., having the same assignee as the present disclosure discloses a method of evaluating an earth formation containing clastic sediments. At least one formation evaluation sensor is conveyed in a borehole in the earth formation and a measurement is made of a property of the earth formation. A pore-scale model of the earth formation whose output substantially matches a value of the measurement is defined. The pore scale model includes grains of the clastic material. The pore scale model is then used to estimate a value of an additional property of the earth formation.

U.S. patent application Ser. No. 11/445,023 of Georgi et al., now U.S. patent Ser. No. 7,363,161, having the same assignee as the present disclosure, discloses a method of evaluating an earth formation containing clastics. NMR signals indicative of a property of the earth formation are obtained. A pore-scale model including grains of the clastics is defined. An NMR response is simulated using the pore-scale model. A parameter of the pore-scale model is adjusted using the simulated response and the NMR signals. The simulated NMR response may include an NMR relaxation time spectrum and adjusting the parameter may be based on deriving a magnetization relaxation spectrum from the NMR signals and using the difference between the NMR relaxation time spectrum and the magnetization relaxation spectrum. The magnetization relaxation spectrum may be derived for a wetting phase that may be oil or water. The parameter being adjusted may be the grain size in the pore-scale model. The simulated NMR relaxation time spectrum may be obtained using a saturation of the wetting phase. Simulations may be made for imbibition or drainage. The difference may be reduced using a least-squares minimization. The pore scale model with the adjusted parameter may be used to simulate an additional property of the earth formation. The additional property may be a permeability, formation factor, and/or a surface to volume probability distribution.

The present disclosure is a significant extension of the teachings of Georgi et al. in that the pore-scale model is determined by using more than one type of measurements. By selection of the types of measurements, it is possible to estimate additional parameters of the pore-scale model. Moreover, the present disclosure broadens the application of the methodology. It shows that it is possible to estimate grain size distribution of the earth formation from downhole logging measurements (specifically, NMR relaxation time spectrum and acoustic velocities). Although pore-scale modeling concept is used in the teaching to illustrate the dependence, it is not necessary for the application of the methodology.

SUMMARY OF THE INVENTION

One embodiment of the disclosure is a method of evaluating an earth formation. The method includes conveying at least one formation evaluation (FE) sensor in a borehole and making a measurement of a property of the formation, defining a model including a distribution of grain sizes of the earth formation whose output matches of value of the measurement, and displaying the formation model. The formation model may be a pore-scale model. The property may be a porosity of the earth formation, a longitudinal relaxation time $T_1$ of the formation, a transverse relaxation time $T_2$ of the formation, a diffusivity of the formation, a compressional velocity, and/or a shear velocity. The method may further include estimating from the model an additional property of the formation. The additional property may be permeability, a formation factor, an S/V distribution function, a relation between capillary pressure and fluid saturation, a relation between permeability and fluid saturation, a relationship between relative permeability and a fluid saturation, a relative permeability of a non-wetting fluid phase in the earth formation, an end-point mobility of a fluid in the earth formation, and a permeability of a first fluid in the earth formation at an irreducible saturation of a second fluid in the earth formation. The method may include characterizing the pore-scale model by a mean value of the grain size and a sorting parameter. The pore-scale model may be defined using geologic data selected from: porosity, amount of overgrowth cement, amount of pore filling cement, type, amount and porosity of pore-filling clay; type, amount and porosity of pore-lining clay; wettability, water saturation, direction of fluid displacement, mineral composition, and/or density of fluids in a pore space. The pore-scale model may be defined by altering a size of the grains, adding a material other than a material of the grains to a pore space of the model, replacing a grain of the material with a different material, accounting for quartz overgrowth, accounting for pore-filling dispersed shale, and/or accounting for compaction. Conveying the at least one FE sensor further may include conveying a first sensor responsive to a mean grain size and a second sensor responsive to a sorting parameter. The at least one FE sensor may be directionally sensitive and defining the pore-scale model further include defining a plurality of different pore-scale models in different directions.

Another embodiment of the disclosure is an apparatus for evaluating an earth formation. The apparatus includes at least one formation evaluation (FE) sensor configured to be conveyed in a borehole and make a measurement of a property of the earth formation and a processor configured to define a formation model including a distribution of grain sizes of the earth formation whose output matches a value of the measurement, and display the pore-scale model. The processor may be further configured to define the formation model by defining a pore-scale model. The FE sensor may be a porosity sensor, a nuclear magnetic resonance sensor, and/or an acoustic sensor. The processor may be further configured to estimate from the model an additional property such as permeability, a formation factor, an S/V probability distribution function, a relation between capillary pressure and a fluid saturation, a relationship between relative permeability and a fluid saturation, a relative permeability of a non-wetting fluid phase in the earth formation, an end-point mobility of a fluid in the earth formation, and/or a permeability of a first fluid in the earth formation at an irreducible saturation of a second fluid in the earth formation. The processor may be further configured to characterize the pore-scale model by a mean value of the grain size and a sorting parameter. The processor may be further configured to define the model using geologic data selected from: porosity, amount of overgrowth cement, amount of pore filling cement, type, amount and porosity of pore-filling clay; type, amount and porosity of pore-lining clay; wettability, water saturation, direction of fluid displacement, mineral composition, and density of fluids in a pore space. The processor may be further configured to define the pore-scale model by altering a size of the grains, adding a material other than a material of the grains to a pore space of the model, replacing a grain of the material with a different material, accounting for quartz overgrowth, accounting for pore-filling dispersed shale, and accounting for compaction. The at least one FE sensor further may include a first sensor responsive to a mean grain size and a second sensor responsive to a sorting parameter. The first sensor may be an NMR sensor and the second sensor may be an acoustic sensor. The at least one FE sensor may be directionally sensitive and the processor may be further configured to define the pore-scale model by defining a plurality of different pore-scale models in different directions. The at least one FE sensor is configured to be carried on a downhole assembly, the apparatus further comprising a conveyance device selected from a wireline, a drilling tubular, and/or a slickline.

Another embodiment is a computer readable medium for use with an apparatus for evaluating an earth formation. The apparatus includes at least one formation evaluation (FE) sensor configured to be conveyed in a borehole and make a measurement of a property of the earth formation. The medium includes instructions that enable a processor to define a model including a distribution of grain sizes of the earth formation whose output matches a value of the measurement, and display the model. The computer readable medium may be a ROM, an EPROM, an EAROM, a Flash Memory, and/or an Optical disk.

BRIEF DESCRIPTION OF THE FIGURES

The file of this patent contains at least one drawing executed in color: Copies of this patent with color drawing(s) will be provided by the Patent and Trademark Office upon request and payment of the necessary fee. The present invention is best understood with reference to the accompanying figures in which like numerals refer to like elements and in which.

We begin our discussion of the present invention with an overview of the different types of formation evaluation sensors whose output may be used with the method. This is followed by a discussion of some exemplary prior art methods related to pore-scale modeling of earth formations and their use in predicting macroscopic properties of earth formations that can be measured by formation evaluation sensors. Following this, the method of the present invention is discussed. It should be noted that the term "formation" as used herein includes "formation fluids."

Figure 1:
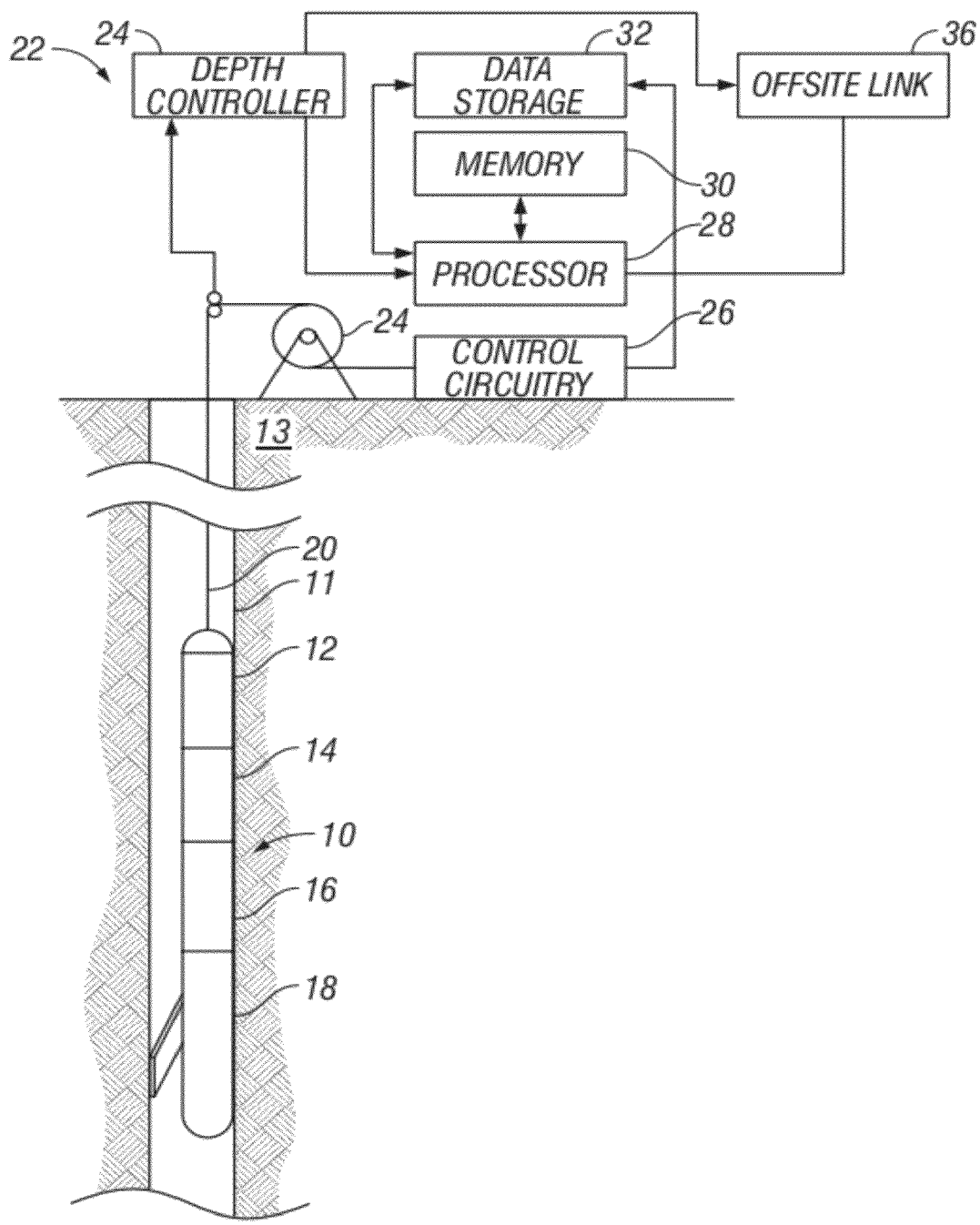
FIG. 1 (prior art) is a schematic illustration of a wireline logging system including a plurality of sensors.

A typical configuration of the logging system is shown in FIG. 1. This is a modification of an arrangement from U.S. Pat. No. 4,953,399 to Fertl et al. having the same assignee as the present invention and the contents of which are incorporated herein by reference. Shown in FIG. 1 is a suite of logging instruments 10, disposed within a borehole 11 penetrating an earth formation 13, illustrated in vertical section, and coupled to equipment at the earth's surface in accordance with the method and apparatus for determining characteristics of clay-bearing formations of the present invention. Logging instrument suite 10 may include a resistivity device 12, a natural gamma ray device 14, and two porosity-determining devices, such as a neutron device 16 and a density device 18. Collectively, these devices and others used in the borehole for logging operations are referred to as formation evaluation sensors. Resistivity device 12 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al. having the same assignee as the present invention and the contents of which are fully incorporated herein by reference may be used. Natural gamma ray device 14 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. Neutron device 16 may be one of several types known to the art for using the response characteristics of the formation to neutron radiation to determine formation porosity. Such a device is essentially responsive to the neutron moderating properties of the formation. Density device 18 may be a conventional gamma-gamma density instrument such as that described in U.S. Pat. No. 3,321,625 to Wahl, used to determine the bulk density of the formation. A downhole processor may be provided at a suitable location as part of the instrument suite.

Instrument suite 10 is conveyed within borehole 11 by a cable 20 containing electrical conductors (not illustrated) for communicating electrical signals between instrument suite 10 and the surface electronics, indicated generally at 22, located at the earth's surface. Logging devices 12, 14, 16 and 18 within instrument suite 10 are cooperatively coupled such that electrical signals may be communicated between each device 12, 14, 16 and 18 and surface electronics 22. Cable 20 is attached to a drum 24 at the earth's surface in a manner familiar to the art. Instrument suite 10 is caused to traverse borehole 11 by spooling cable 20 on to or off of drum 24, also in a manner familiar to the art.

Surface electronics 22 may include such electronic circuitry as is necessary to operate devices 12, 14, 16 and 18 within instrument suite 10 and to process the data therefrom. Some of the processing may be done downhole. In particular, the processing needed for making decisions on speeding up (discussed below) for slowing down the logging speed is preferably down downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision making is carried out. However, with present data rates available on MWD/LWD, the decision making is preferably done downhole.

Control circuitry 26 contains such power supplies as are required for operation of the chosen embodiments of logging devices within instrument suite 10 and further contains such electronic circuitry as is necessary to process and normalize the signals from such devices 12, 14, 16 and 18 in a conventional manner to yield generally continuous records, or logs, of data pertaining to the formations surrounding borehole 11. These logs may then be electronically stored in data storage 32 prior to further processing. The processor 28 includes the ability, such as that described in U.S. Pat. No. 4,271,356 to Groeschel et al, for separating radiation measurements from natural gamma ray device 14 into individual energy bands centered about energy peaks of selected elemental sources of radiation, preferably the energy peaks of potassium, uranium and thorium. This processing of the natural gamma ray device could also be done by the downhole processor.

Surface electronics 22 may also include such equipment as will facilitate machine implementation of the method of the present invention. Processor 28 may be of various forms but preferably is an appropriate digital computer programmed to process data from logging devices 12, 14, 16 and 18. Memory unit 30 and data storage unit 32 are each of a type to cooperatively interface with processor 28 and/or control circuitry 26. Depth controller 34 determines the longitudinal movement of instrument suite 20 with borehole 11 and communicates a signal representative of such movement to processor 28. The logging speed is altered in accordance with speedup or slowdown signals that may be communicated from the downhole processor, or provided by the surface processor, as discussed below. This is done by altering the rotation speed of the drum 24. Offsite communication may be provided, for example by a satellite link, by the telemetry unit 36.

While running different logging instruments in a single wireline run, the present invention may use a configuration disclosed in U.S. Pat. No. 7,082,994 of Frost et al. The teachings of Frost recognize the fact that different logging instruments operate best at different standoffs from the borehole wall.

Figure 2:
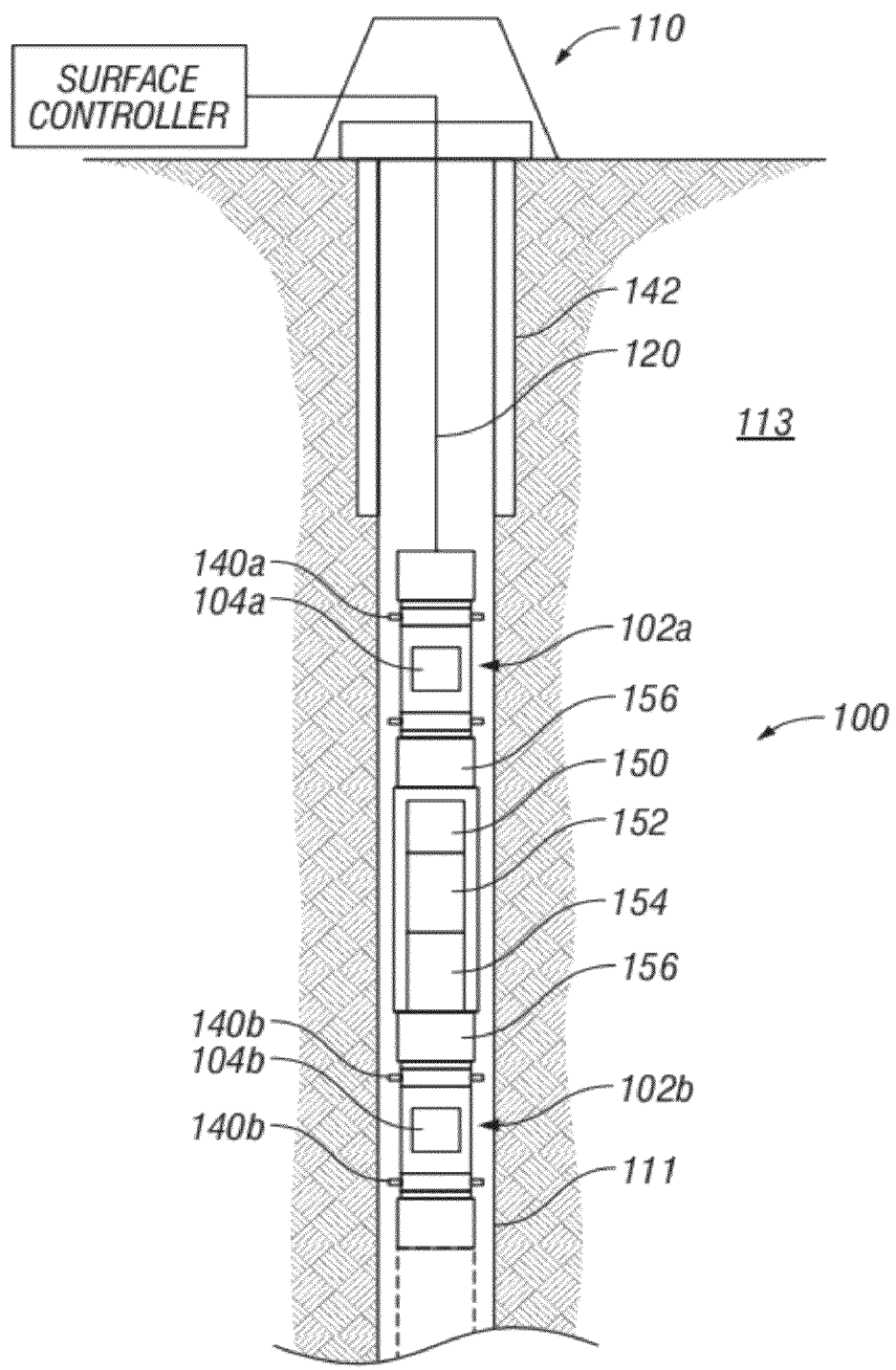
FIG. 2 (prior art) is an elevational view of a system using radially adjustable module adapted for use in logging operations.

Referring next to FIG. 2, there is shown a rig 110 on the surface that is positioned over a subterranean formation of interest. The rig 110 can be a part of a land or offshore a well production/construction facility. A borehole formed below the rig 110 includes a cased portion 142 and an open-hole portion 111. In certain instances (e.g., during drilling, completion, work-over, etc.), a logging operation is conducted to collect information relating to the formation and the borehole. Typically, a tool system 100 is conveyed downhole via a wireline 120 to measure one or more parameters of interest relating to the borehole and/or the formation 113. The term "wireline" as used hereinafter includes a cable, a wireline, as well as a slickline. The tool system 100 can include an instrument suite comprising one or more modules 102a, b, each of which has a tool or a plurality of tools 104a, b, adapted to perform one or more downhole tasks. The term "module" should be understood to be a device such as a sonde or sub that is suited to enclose, house, or otherwise support a device that is to be deployed into a borehole. While two proximally positioned modules 102a, b and two associated tools 104a, b, are shown, it should be understood that a greater or fewer number may be used.

In one embodiment, the tool 104a is a formation evaluation sensor adapted to measure one or more parameters of interest relating to the formation or borehole. It should be understood that the term formation evaluation sensor encompasses measurement devices, sensors, and other like devices that, actively or passively, collect data about the various characteristics of the formation, directional sensors for providing information about the tool orientation and direction of movement, formation testing sensors for providing information about the characteristics of the reservoir fluid and for evaluating the reservoir conditions. The formation evaluation sensors may include resistivity sensors for determining the formation resistivity and dielectric constant, acoustic sensors for determining the acoustic porosity of the formation and the bed boundary in formation, nuclear sensors for determining the formation density, neutron porosity and certain rock characteristics, nuclear magnetic resonance sensors for determining the porosity and other petrophysical characteristics of the formation. The direction and position sensors may include a combination of one or more accelerometers and one or more gyroscopes or magnetometers. The accelerometers preferably provide measurements along three axes. The formation testing sensors collect formation fluid samples and determine the properties of the formation fluid, which include physical properties and chemical properties. Pressure measurements of the formation provide information about the reservoir characteristics and the net confining stress.

The tool system 100 can include telemetry equipment 150, a local or downhole controller (processor) 152 and a downhole power supply 154. The telemetry equipment 150 provides two-way communication for exchanging data signals between a surface controller 112 and the tool system 100 as well as for transmitting control signals from the surface processor 112 to the tool system 100.

In an exemplary arrangement, and not by way of limitation, a first module 102a includes a tool 104a configured to measure a first parameter of interest and a second module 102b includes a tool 104b that is configured to measure a second parameter of interest that is either the same as or different from the first parameter of interest. In order to execute their assigned tasks, tools 104a and 104a may need to be in different positions. The positions can be with reference to an object such as a borehole, borehole wall, and/or other proximally positioned tooling. Also, the term "position" is meant to encompass a radial position, inclination, and azimuthal orientation. Merely for convenience, the longitudinal axis of the borehole ("borehole axis") will be used as a reference axis to describe the relative radial positioning of the tools 104a, b. Other objects or points can also be used as a reference frame against which movement or position can be described. Moreover, in certain instances, the tasks of the tools 104a, b can change during a borehole-related operation. Generally speaking, tool 104a can be adapted to execute a selected task based on one or more selected factors. These factors can include, but not limited to, depth, time, changes in formation characteristics, and the changes in tasks of other tools.

Modules 102a and 102b may each be provided with positioning devices 140a, 140b, respectively. The positioning device 140 is configured to maintain a module 102 at a selected radial position relative to a reference position (e.g., borehole axis). The position device 140 also adjusts the radial position of module 102 upon receiving a surface command signal and/or automatically in a closed-loop type manner. This selected radial position is maintained or adjusted independently of the radial position(s) of an adjacent downhole device (e.g., measurement tools, sonde, module, sub, or other like equipment). An articulated member, such a flexible joint 156 which couples the module 102 to the tool system 100 provides a degree of bending or pivoting to accommodate the radial positioning differences between adjacent modules and/or other equipment (for example a processor sonde or other equipment). In other embodiments, one or more of the positioning devices has fixed positioning members.

The positioning device 140 may include a body 142 having a plurality of positioning members 144 (a, b, c) circumferentially disposed in a space-apart relation around the body 142. The members 144 (a, b, c) are adapted to independently move between an extended position and a retracted position. The extended position can be either a fixed distance or an adjustable distance. Suitable positioning members 144 (*a, b, c*) include ribs, pads, pistons, cams, inflatable bladders or other devices adapted to engage a surface such as a borehole wall or casing interior. In certain embodiments, the positioning members 144 (*a, b, c*) can be configured to temporarily lock or anchor the tool in a fixed position relative to the borehole and/or allow the tool to move along the borehole.

Drive assemblies 146 (*a, b, c*) are used to move the members 144 (*a, b, c*). Exemplary embodiments of drive assemblies 146 (*a, b, c*) include an electro-mechanical system (e.g., an electric motor coupled to a mechanical linkage), a hydraulically-driven system (e.g., a piston-cylinder arrangement fed with pressurized fluid), or other suitable system for moving the members 144 (*a, b, c*) between the extended and retracted positions. The drive assemblies 146 (*a, b, c*) and the members 144 (*a, b, c*) can be configured to provide a fixed or adjustable amount of force against the borehole wall. For instance, in a positioning mode, actuation of the drive assemblies 146 (*a, b, c*) can position the tool in a selected radial alignment or position. The force applied to the borehole wall, however, is not so great as to prevent the tool from being moved along the borehole. In a locking mode, actuation of the drive assembly 146 (*a, b, c*) can produce a sufficiently high frictional force between the members 144 (*a, b, c*) and the borehole wall as to prevent substantial relative movement. In certain embodiments, a biasing member (not shown) can be used to maintain the positioning members 144 (*a, b, c*) in a pre-determined reference position. In one exemplary configuration, the biasing member (not shown) maintains the positioning member 144 (*a, b, c*) in the extended position, which would provide centralized positioning for the module. In this configuration, energizing the drive assembly overcomes the biasing force of the biasing member and moves one or more of the positioning members into a specified radial position, which would provide decentralized positioning for the module. In another exemplary configuration, the biasing member can maintain the positioning members in a retracted state within the housing of the positioning device. It will be seen that such an arrangement will reduce the cross sectional profile of the module and, for example, lower the risk that the module gets stuck in a restriction in the borehole.

The positioning device 140 and drive assembly 146 (*a, b, c*) can be energized by a downhole power supply (e.g., a battery or closed-loop hydraulic fluid supply) or a surface power source that transmits an energy stream (e.g., electricity or pressurized fluid) via a suitable conduit, such as the umbilical 120. Further, while one drive assembly (e.g., drive assembly 146a) is shown paired with one positioning member 144 (e.g., position member 144a), other embodiments can use one drive assembly to move two or more positioning members. The outputs of formation evaluation sensors of the type discussed above, and the outputs of other sensors are used in the present invention in conjunction with pore-scale modeling of earth formations.

The method of the present invention is based upon the use of pore-scale modeling together with measurements that may be made by one or more FE sensors including but not limited to the types discussed above with reference to FIGS. 1-2. Before discussing the method of the present invention, we briefly review some of the basic concepts involved in pore-scale modeling.

Sedimentary rocks are traditionally classified using petrographic models. The models are used to distinguish between lithologies differing in mineralogy and matrix materials composed predominately of either terrigenous material or biochemical and inorganic chemical precipitants. The two major lithologies derived from these distinctions are "clastic" versus "carbonate" rocks. The term "carbonate" as used in Ramakrishnan (U.S. Pat. No. 6,088,656) refers to biochemical rocks which are precipitated from water chemistry due to the metabolic processes of organisms. In a broad context, they are commonly referred to as "limestones" however their classification is further refined using other parameters. Carbonate rocks are classified according to their proportion of fine grained carbonate grains (carbonate mud) versus larger grains known as "allochems". Allochems include intraclasts, ooilites, pelloids, and fossil fragments. The most widely used classification is that of Dunham.

In contrast to carbonate classifications, clastic sedimentary rock classifications are based on varying proportions of clasts of different material and grain size composed of minerals and rock fragments. The term "clastic" is derived from a Greek word meaning broken. The accumulation of this terrigenous material is the direct result of the following dynamic subaerial and subaqueous processes: (1) gravity driven mass wasting (downslope slides), (2) winds resulting from atmospheric phenomena such as found in the aeolian environment, (3) gravity driven flowing water (fluvial and alluvial), and (4) tide and wind driven wave energy (nearshore). Subaqueous processes also include (a) gravity driven sedimentation forcing the deposition of suspended sediment onto the floor of water bodies (pelagic and lacustrian sedimentation), (b) thermally forced current flow, and (c) gravity forced turbid flow of water-saturated sediments (turbidity flow). The present invention is illustrated using clastic sediments as an example.

Figure 3:
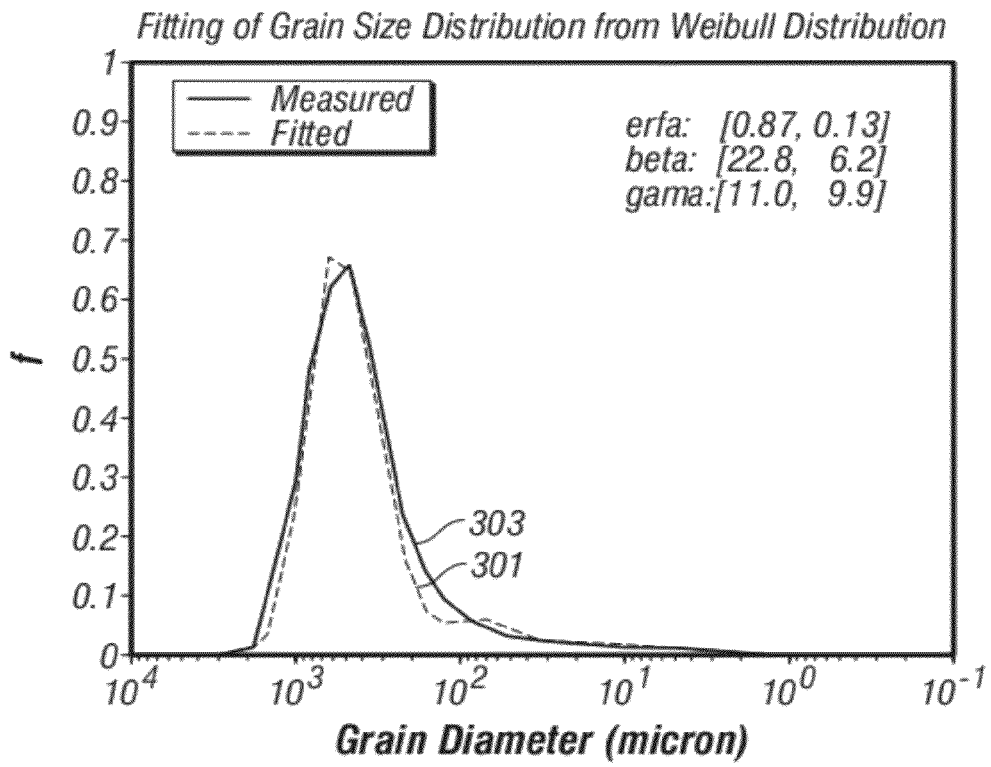
FIG. 3 shows a comparison between a measured grain-size distribution and a fit using a Weybull distribution.

A pore scale model of spheres is the starting point for the characterization of clastic sediments. Input of an arbitrary distribution for grain size would be ideal. However, that would require solving for many parameters, which may not be feasible for actual log data interpretation. Fortunately, studies showed that certain patterns exist for formation grain size distribution for natural rocks such as log-normal, Weibull, log-hyperbolic, log-skew-Laplace, etc. In this document, log-normal and Weibull distribution were selected for the pre-construction of the initial grain size distribution. As an example, Eqs. (2) and (3) show the tri-modal incremental $f(X)$ and cumulative $P(X)$ Weibull distribution.

$$f(X) = \sum_{i=1}^{3} \alpha_i \frac{\beta_i}{\gamma_i} \left(\frac{X}{\gamma_i}\right)^{\beta_i - 1} \exp\left(-\left(\frac{X}{\gamma_i}\right)^{\beta_i}\right) \quad (1)$$

$$X > 0, \alpha_i > 0, \beta_i > 0, \gamma_i > 0, \sum \alpha_i = 1$$

$$P(X) = \sum_{i=1}^{3} \alpha_i \left(1 - \exp\left(-\left(\frac{X}{\gamma_i}\right)^{\beta_i}\right)\right) \quad (2)$$

Where $\beta_i$ is the shape factor, $\gamma_i$ is the scale factor, $\alpha_i$ is the intensity, X is defined as follows, $$X = \ln\left(\frac{r_g}{r_{g,0}}\right) \quad (3)$$

where $r_g$ is grain size, $r_{g,0}$ is the minimum grain size chosen in the pre-construction of the initial grain size distribution. FIG. 3 shows an example of a Weibull distribution 303. The parameters of the distribution are obtained from data fitting of a measured grain size distribution 301.

The model rock system constructed from the current version of pore scale forward modeling is based on random dense packing of equal spheres (a single inputted grain size). Surface to volume ratio (S/V) and $T_2$ distribution due to surface relaxation is simulated for this model rock system. For single mineralogy systems, $T_{2,S}$ is calculated as $$\frac{1}{T_{2,S}} = \rho_2 \left(\frac{S}{V}\right) \quad (4)$$

Similarly, for multiple mineralogy systems, $T_{2,S}$ is calculated as $$\frac{1}{T_{2,S}} = \left(\frac{\sum_j \rho_{2,j} \cdot S_j}{V}\right) \quad (5)$$

where $\rho_{2,j}$ and $S_j$ are the surface relaxivity and surface area for the $j^{th}$ grain forming the pore. $T_{2,S}$ in Eqs. (4) and (5) are for the wetting phase due to surface relaxation. When bulk relaxation and relaxation due to diffusion is also important, the total $T_2$ relaxation rate can be simply calculated as follows $$\frac{1}{T_2} = \frac{1}{T_{2,B}} + \frac{1}{T_{2,S}} + \frac{1}{T_{2,D}} \quad (6)$$

The surface area S ($S_j$) in Eqs. (4) and (5) corresponds to the actual surface area that is experienced by fluid molecules in an NMR $T_2$ relaxation process.

Scanning Electron Microscope (SEM) images of thin sections of rock samples clearly indicate that the grain surfaces are rough. Therefore, a surface roughness factor is additionally introduced to multiply the surface area from the random dense packing of equal spheres of "smooth" surface. Moreover, surface roughness factor can account for the effect on NMR of the complex mineralogy and the various geological processes such as sedimentation, cementation, compaction, diagenesis, and so on.

The general definition of surface roughness is as follows $$R_S = \frac{S_{true}}{S_{geom.}} \quad (7)$$

where $S_{true}$ and $S_{geom.}$ are the true surface area and geometric surface area, respectively.

The true surface area can be determined from BET gas adsorption analysis. The geometric surface area can be determined from the pore-scale geometry modeling of S/V (before applying the empirical surface roughness factor). Then Eq. (7) becomes $$R_S = \frac{(V/S)_{PSM, Smooth\ Surface}}{(V/S)_{BET}} \quad (8)$$

$$(V/S)_{BET} = \frac{\phi}{(1-\phi) \cdot \rho_g \cdot S_{BET}} \quad (9)$$

Where $\phi$ is porosity, $\rho_g$ is grain density, $S_{BET}$ is BET surface area (m²/g).

Alternatively, surface roughness factor (and surface relaxivity) can be determined by matching the simulated grain size distribution with the measured grain size distribution.

Figure 4:
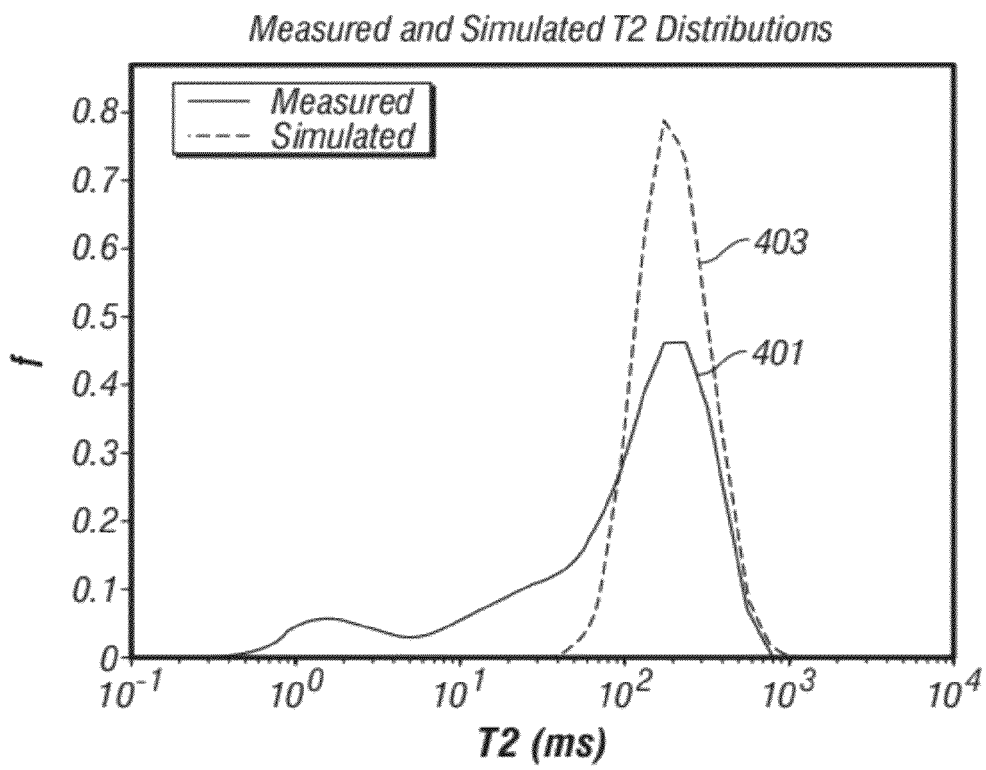
FIG. 4 shows a comparison between a measured $T_2$ distribution and a simulated $T_2$ distribution.

FIG. 4 shows the simulated $T_2$ relaxation time distributions 403 from pore scale modeling with one single inputted grain size. The measured $T_2$ relaxation time 401 distribution is plotted for comparison. The core is at 100% water saturation. The inputted parameters in the simulation are as follows: mineralogy of 100% wt quartz (from X-Ray Diffraction analysis); porosity of 19.2 p.u.; grain radius of 62.5 μm (from laser grain size analysis); $R_s$=3.4; $\rho_2$=12.5 μm/sec. FIG. 4 indicates that while the simulated $T_2$ agrees with the measured $T_2$ at larger $T_2$ bins (larger pores/grains), deviation exists at smaller $T_2$ bins.

Figure 5:
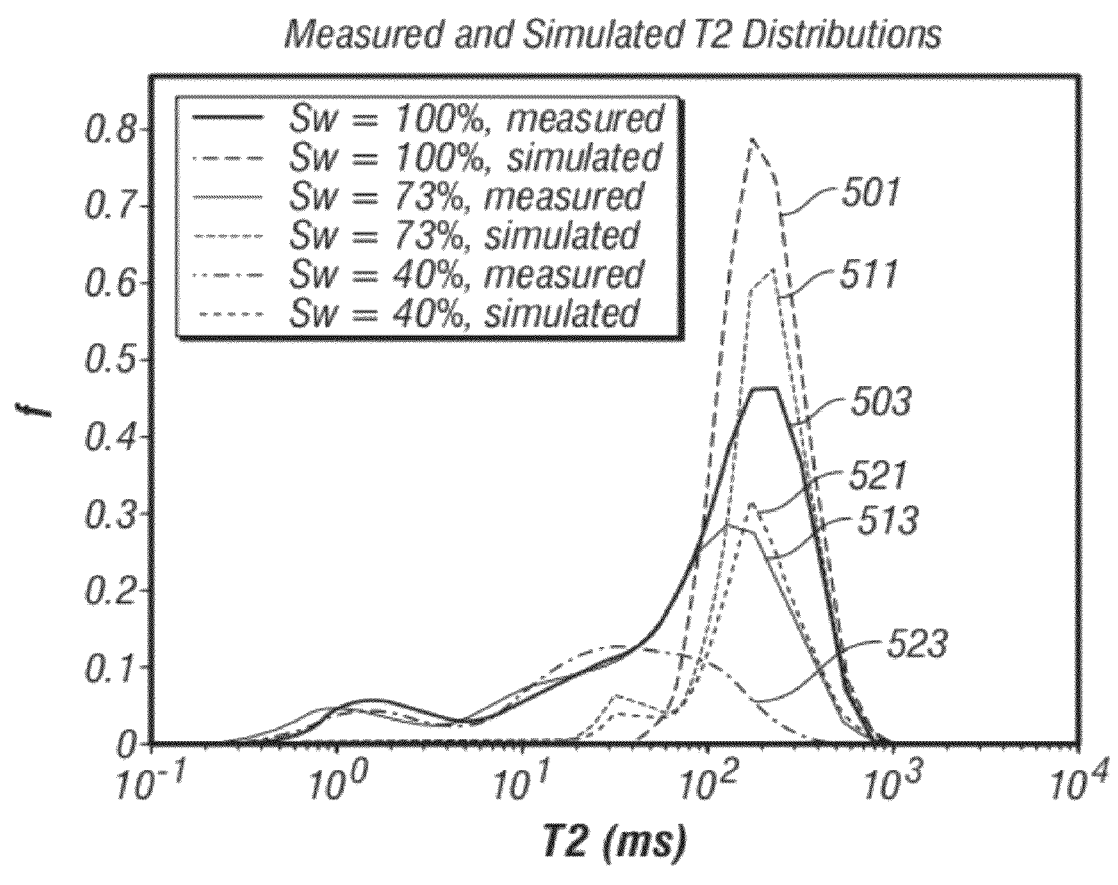
FIG. 5 shows comparisons between measured and simulated $T_2$ distributions for different water saturations.

Similarly, FIG. 5 shows the simulated $T_2$ relaxation time distributions at partial water saturations with a single inputted grain size. The $T_2$ relaxation time distributions at 100% $S_w$ (501-simulated, 503-measured) are plotted for reference. The input parameters are the same as those for FIG. 4, except for the water saturation values. FIG. 5 indicates that at reduced water saturation, the simulated $T_2$ deviates from that of the measured $T_2$ when only one grain size is inputted. 511 and 513 are the simulated $T_2$ distributions for 73% $S_w$ while 521 and 523 are the simulated $T_2$ distributions for 40% $S_w$.

FIGS. 4 and 5 shown above suggest that the $T_2$ relaxation time distribution from pore scale modeling with an inputted grain size distribution is necessary. In this document, this was done with a simplified approach as follows. First, the pre-constructed cumulative grain size distribution is partitioned into 30 points of discrete grain sizes. Then the S/V distribution is simulated from pore scale modeling at each grain size. Finally, summation of S/V is performed and the $T_2$ relaxation time distribution computed.

Figure 6A:
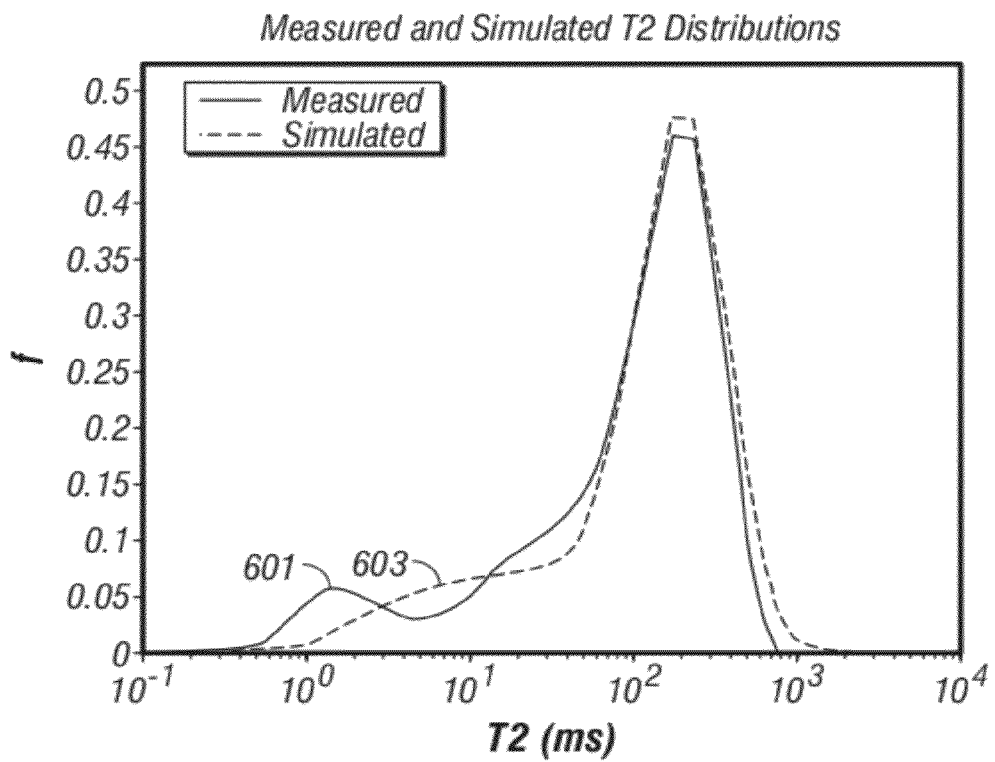
FIGS. 6A, 6B show simulated $T_2$ distributions using a measured grain size distribution.

FIG. 6A shows the simulated $T_2$ relaxation time distribution 603 from pore scale modeling using the above approach, the measured $T_2$ distribution 601 as well as the inputted grain size distribution 621 from laser grain size measurement. The core is at 100% water saturation. Compared with FIG. 5, the agreement between the simulated and measured $T_2$ relaxation time distributions is improved.

In the presence of both water and hydrocarbon liquids, the fluid distribution inside a water-wet pore system is characterized by water staying in the small pores, while hydrocarbon stay in the center of the larger pores with a thin water film on the grain surface. Consider a simple case that the small pores are enclosed by small grains while large pores are enclosed by large grains, then the capillary displacement of a 100% water saturated core results in water being depleted from the larger pores. Therefore, the grain size distribution (from a small to large value) input to the pore scale modeling should be consistent to the grain sizes corresponding to water saturation.

The model inputs also require a water phase $T_2$ relaxation time distribution. For the laboratory core samples, it can come from the $T_2$ of the core at water/air condition. For the log interpretation, it can come from fluid typing techniques such as 2D NMR.

Figure 6B:
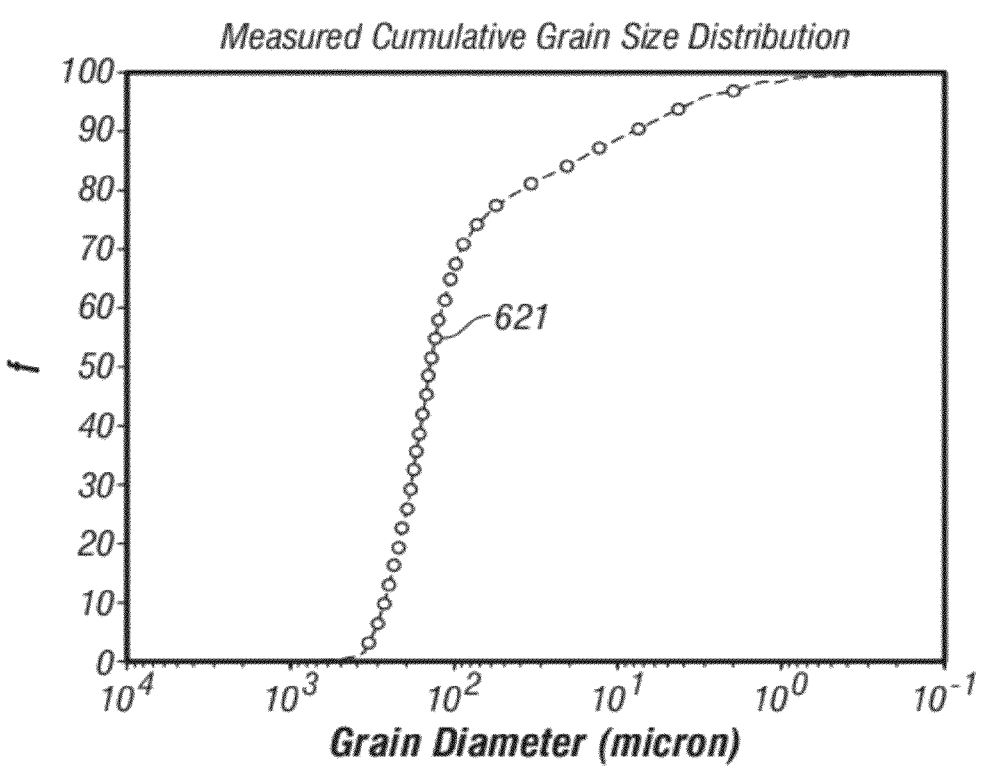
Figure 7:
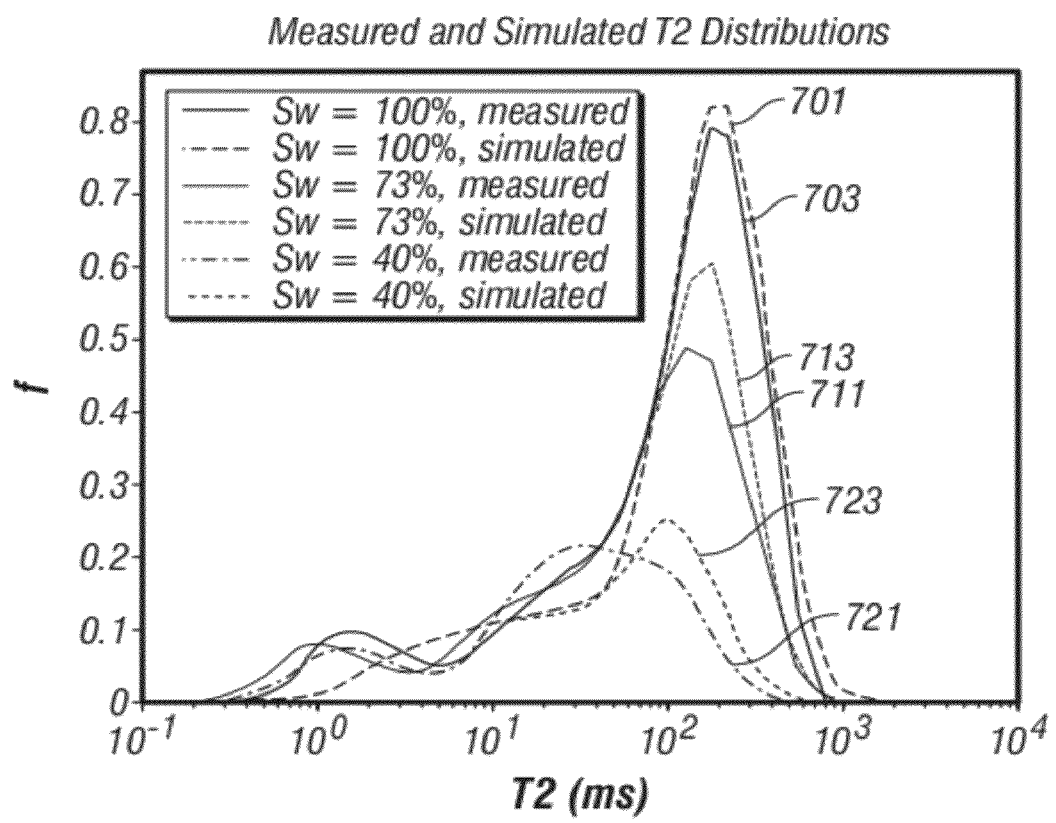
FIG. 7 shows simulated $T_2$ distributions using a grain size distribution for different water saturations.

FIG. 7 shows the simulated $T_2$ relaxation time distributions at partial water saturation from pore scale modeling using the above approach (711, 713 for $S_w$=73%, 721, 723 for $S_w$=40%). $T_2$ at 100% $S_w$ is plotted for reference (701, 703). Compared with FIG. 6, the agreement between the simulated and measured $T_2$ relaxation time distributions is much improved.

Next, the calculated $T_2$ relaxation time distribution is fitted with the measured $T_2$ by minimizing the following error function (Eq. (10)). During this process, the model parameters in the pre-construction of grain size distribution were determined. In turn, the final grain size distribution is calculated by Eqs. (1) and (2).

$$g(\alpha_j, \beta_j, \gamma_j) = \min\left(\sum_{i=1}^{n} (f_i^{calc} - f_i^{meas})^2\right) \quad (10)$$

where $f_i^{calc}$ and $f_i^{meas}$ are the intensity of the $i^{th}$ bin in the calculated and measured $T_2$ relaxation time distribution, respectively.

Notice that Eq. (10) is a non-linear least square problem, but the relationship between $\alpha$, $\beta$, $\lambda$ and $f^{calc}$ is not functional. Therefore, discrete grid points in the parameter space of $\alpha$, $\beta$, $\lambda$ are assigned and optimized to accomplish minimal error.

We next discuss the effects of mineralogy on $T_2$ relaxation time. As an example, measurements were made on three samples of Berea sandstone with properties listed in Table 1.

TABLE 1

Porosity, air-perm, and mineralogy for the Berea cores in FIG. 9

| | | Core # | | |
|---|---|---|---|---|
| | | BSS1 | BSS2 | BSS3 |
| Porosity (%) | | 29.8 | 29.2 | 30.8 |
| Air-perm (md) | | 13263 | 10385 | 7155 |
| Mineralogy | Quartz | 47 | 59 | 45 |
| | Feldspar | 29 | 32 | 51 |
| | Carbonate | 13 | 5 | 1 |
| | Clay | 9 | 4 | 3 |
| | Anhydrite | 2 | 0 | 0 |

Figure 8A:
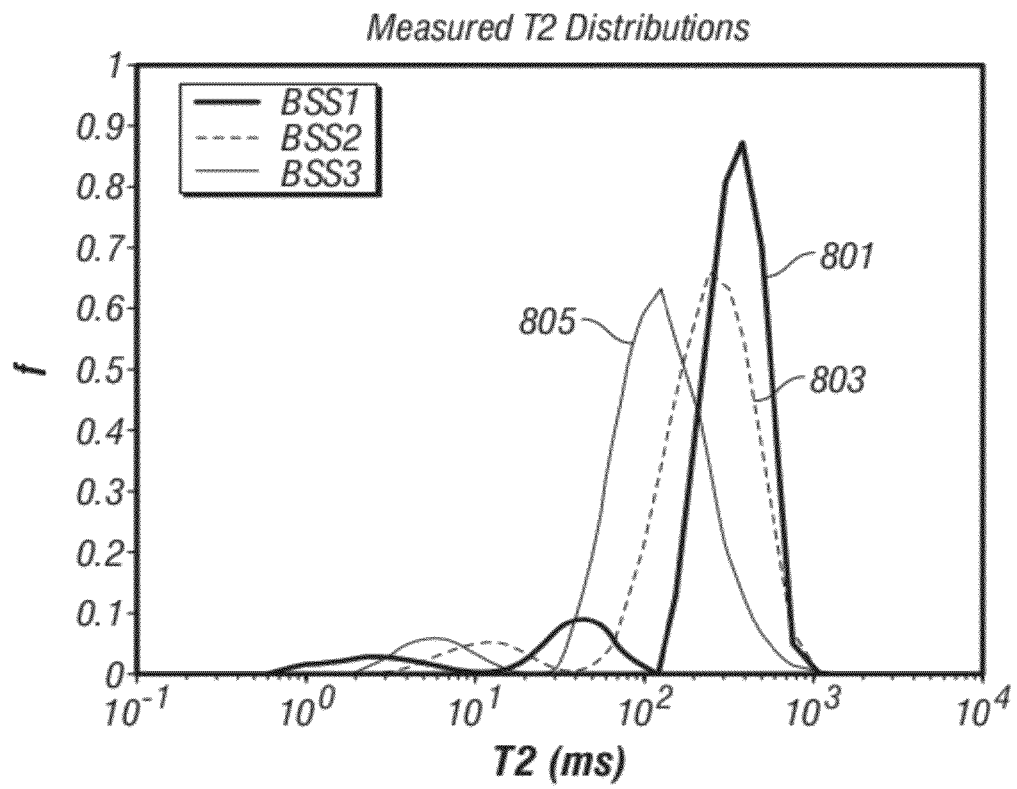
FIG. 8A, 8B show $T_2$ distributions of sandstones with different feldspar content at 100% water saturation.
Figure 8B:
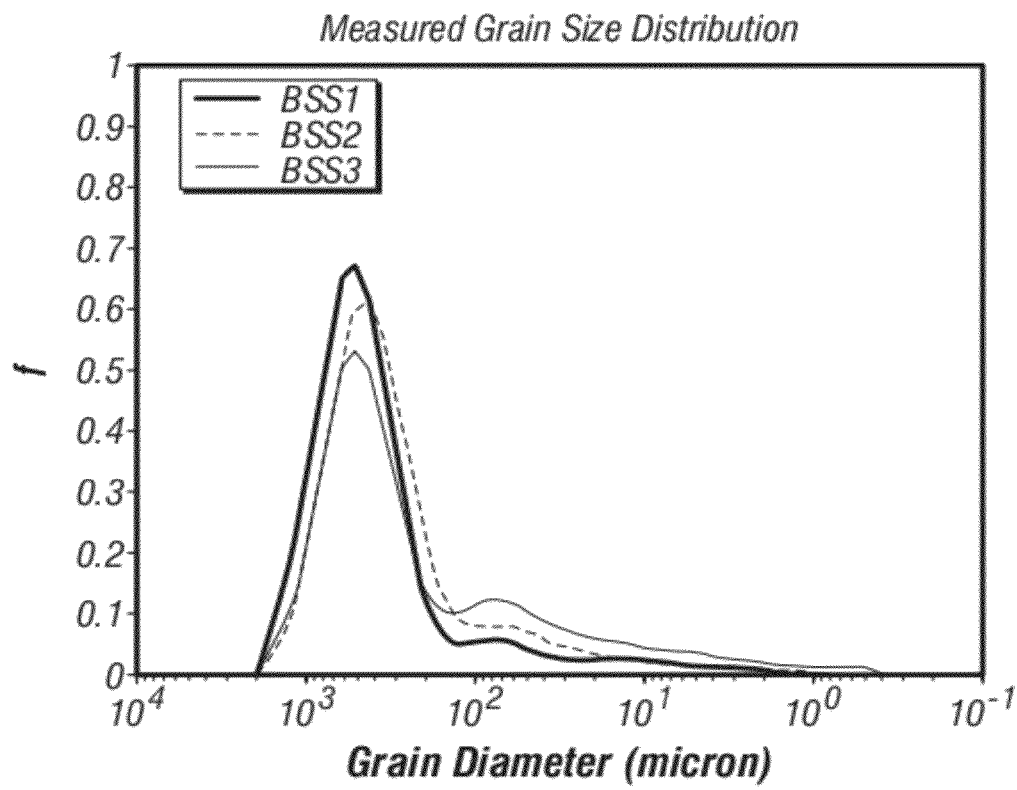

FIG. 8A shows the measured $T_2$ distributions (at 100% water saturation) for BSS1 801, BSS2 803 and BSS3 805 respectively and FIG. 8B shows the measured grain size distributions (by laser grain size analysis). The cores studied are outcrop Berea cores with similar porosity and air-permeability but different quartz and feldspar content (Table 1). FIG. 8B shows that although the grain sizes are similar (curves are very similar), the $T_2$ relaxation time decreases when the feldspar content increases.

Figure 9A:
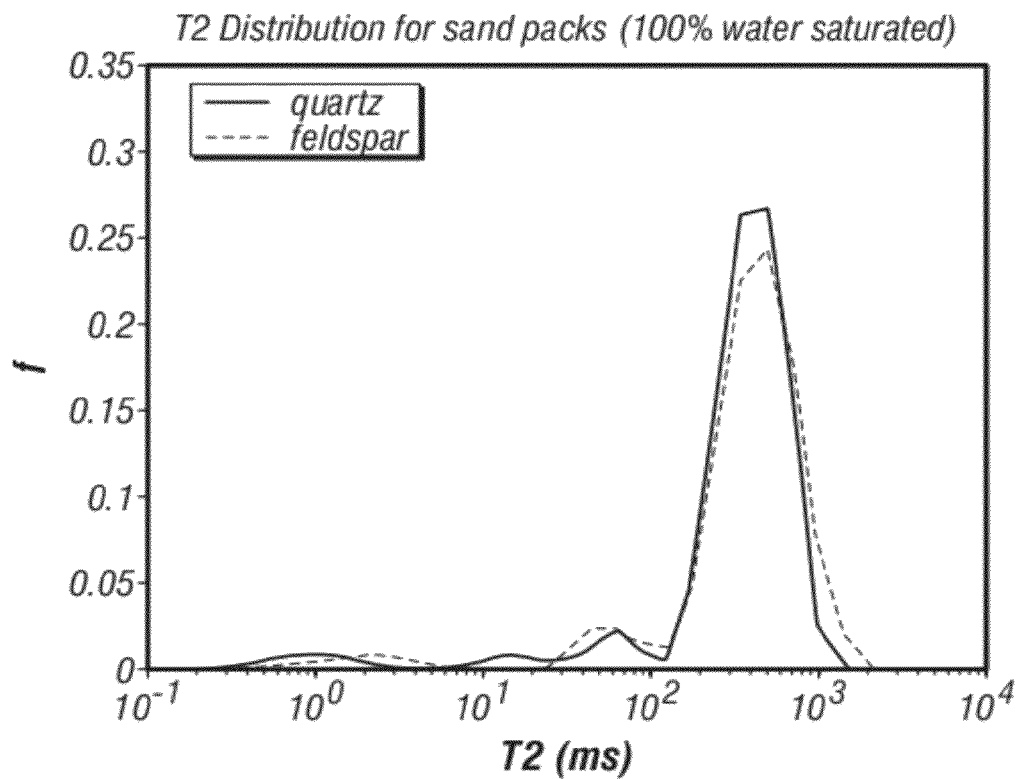
FIG. 9A, 9B show $T_2$ distributions and grain sizes for sand packs of pure quartz and pure feldspar.
Figure 9B:
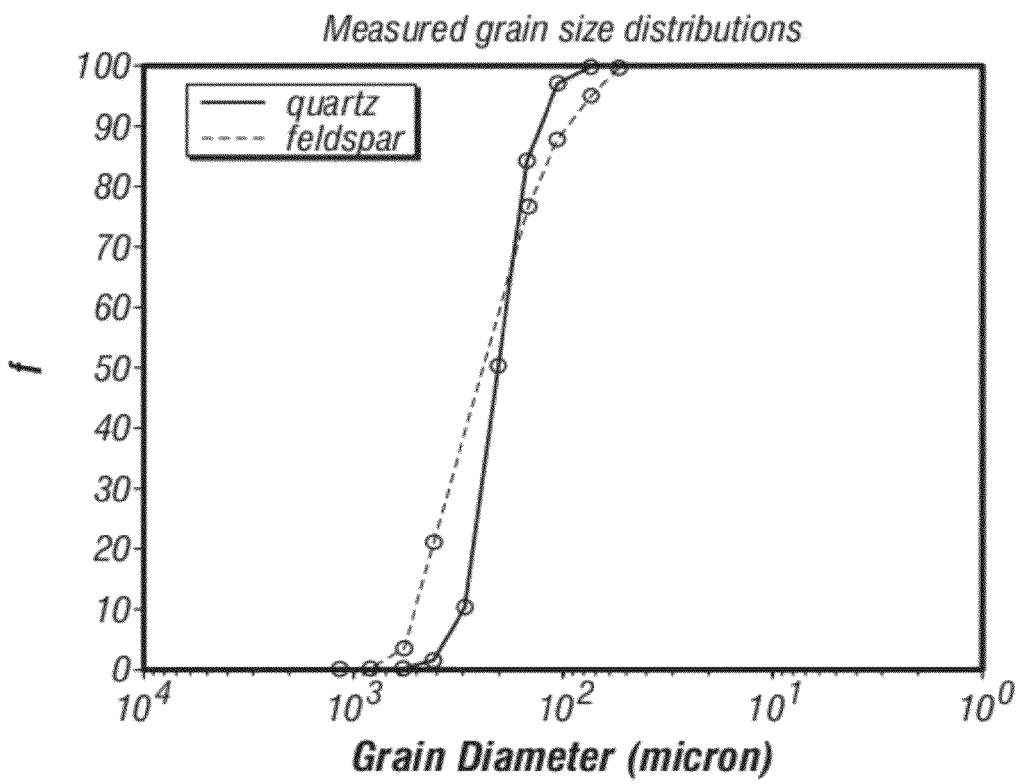

FIG. 9 suggests that the shift of $T_2$ to shorter relaxation time is related to the feldspar content. To investigate which aspect of the feldspar property affects the $T_2$, $T_2$ of 100% water saturated sand packs of pure quartz sand and pure feldspar sand (from outcrop quarry) were measured, shown in FIG. 9A. The grain sizes (from sieve analysis) are similar as shown in FIG. 9B. Since the $T_2$ of the sand packs of pure quartz and pure feldspar are similar to each other, it suggests that the shift of $T_2$ observed in FIG. 8 is not related to the chemical property of the feldspar.

Figure 10A:
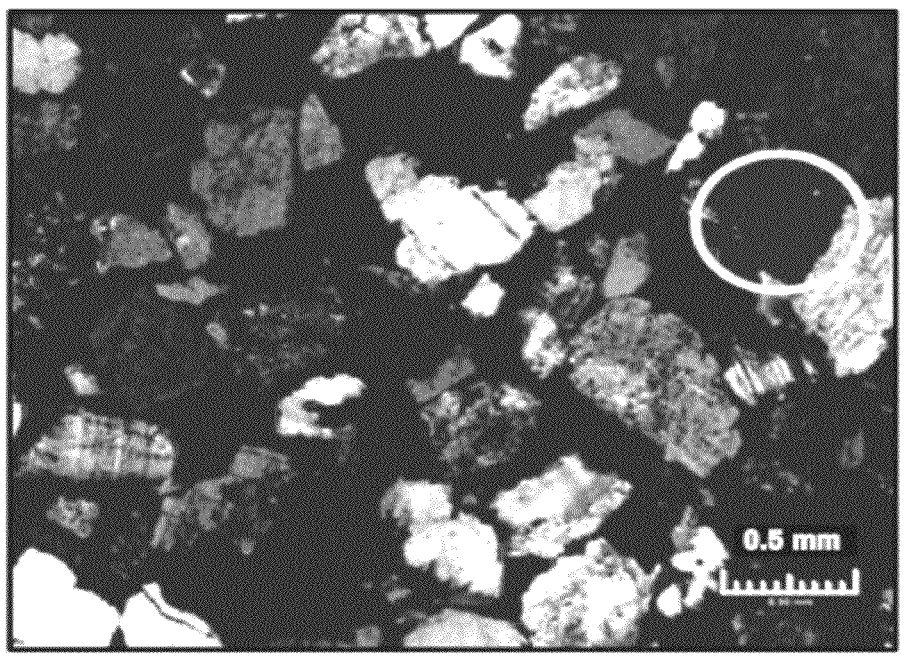
FIG. 10A, 10B shows two thin sections with different amounts of feldspar.
Figure 10B:
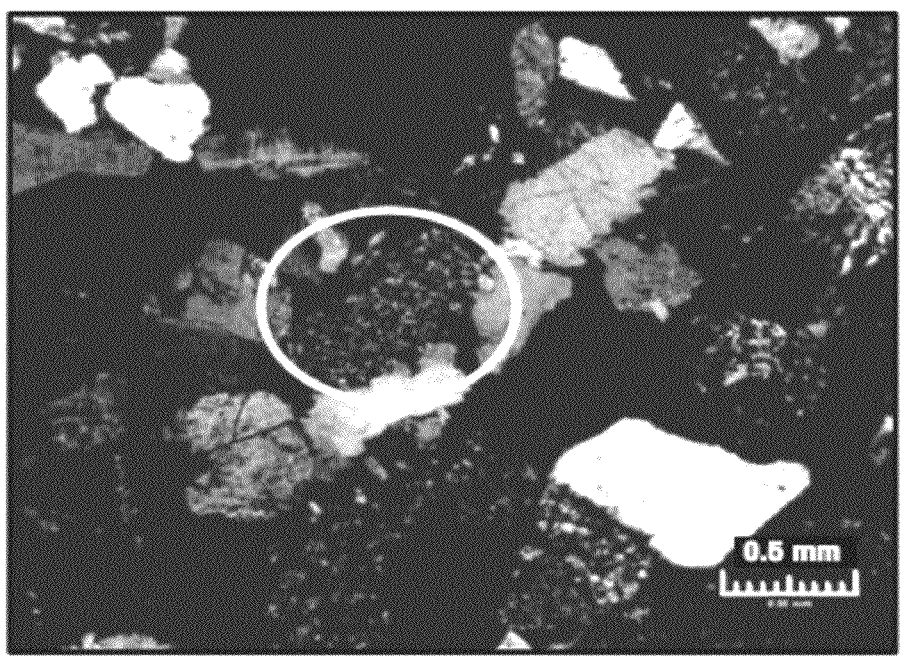

FIG. 10 compares the thin sections of BSS1 FIG. 10A and BSS3 FIG. 10B. BSS1 and BSS3 have feldspar content (in weight percentage) of 29% and 51%, respectively. See Table 1. FIG. 10 clearly shows that the feldspar in BSS3 has undergone some weathering and dissolution processes to a more severe degree than BSS1 (refer to the white circles), resulting in higher surface area although the grain sizes are similar. This observation suggests that the shift of $T_2$ shown in FIG. 8 is related to the surface property (surface area) of the feldspar. A surface roughness factor as illustrated was introduced to account for the effect of mineralogy on $T_2$ and the effect of mineralogy on the determination of grain size from $T_2$. Moreover, two scenarios were identified for the determination of grain size distribution from $T_2$ as (a) quartz-only and (b) quartz plus altered feldspar grains.

Figure 11:
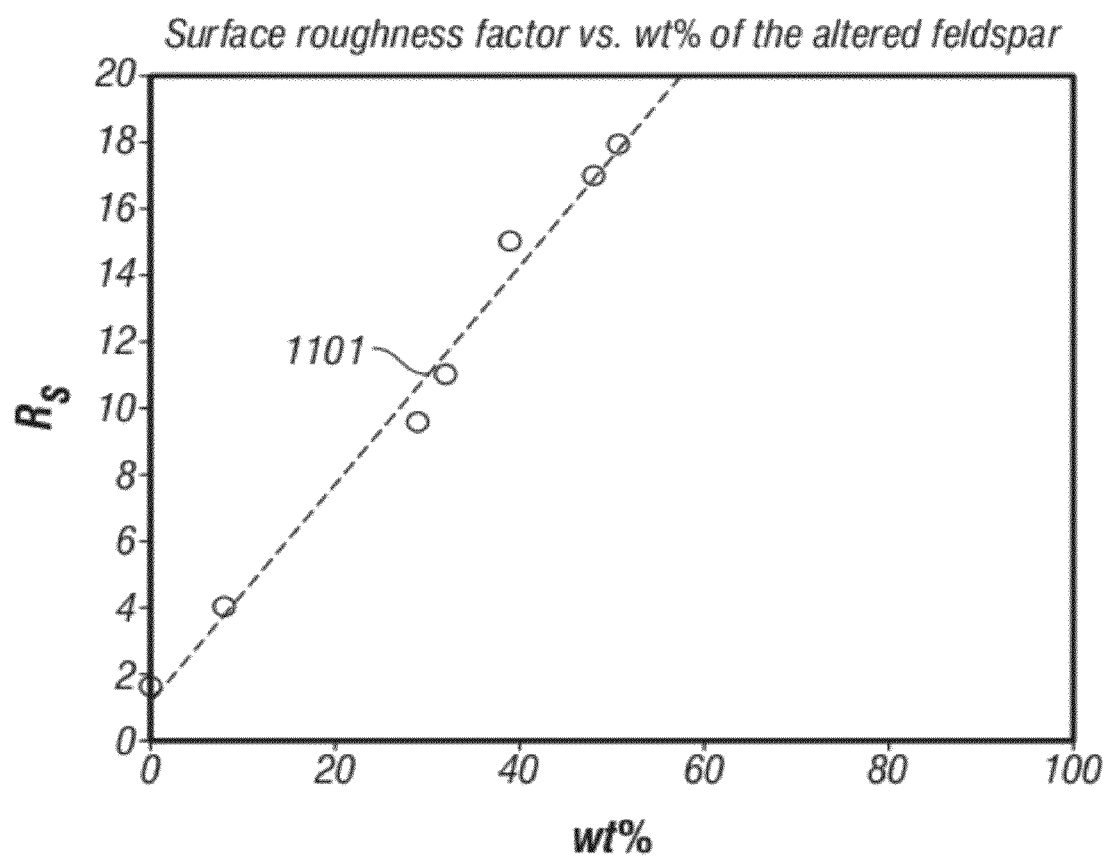
FIG. 11 shows an exemplary roughness factor.

Surface roughness factor and surface relaxivity were determined by matching the simulated grain size distribution with the measured grain size distribution. For the quartz dominated cores, $(\rho_2 * R_S) = (33.7 \pm 6.5)$ μm/sec. If the surface relaxivity of water for quartz surface is set to be 10 μm/sec, which is reasonable according to a published summary of surface relaxivity values, then the surface roughness factor for quartz surface is $3.4 \pm 0.7$. Applying this value of the surface roughness factor of quartz from the quartz dominated cores to the cores with quartz plus altered feldspar, the surface roughness factor for feldspar surface is estimated, and shown in FIG. 11 by 1101. The abscissa is the percentage by weight of feldspar and the ordinate is the roughness factor.

For the quartz plus altered feldspar cores, the surface relaxivity of water for quartz surface and for feldspar surface are set to be 10 and 25 μm/sec, respectively. Larger values of surface relaxivity for feldspar than quartz are attributed to surface coatings, of smectite, illite or kaolinite, which have formed from the weathering or dissolution of the feldspar surface. Moreover, $R_S$ of the feldspar is much larger than that of the quartz reflecting the weathering and dissolution processes. Note that the surface roughness factor for feldspar at the end point of 0 wt % has taken into account the different values of surface relaxivity for quartz (10 μm/sec) and altered feldspar grain (25 μm/sec)

Figure 12A:
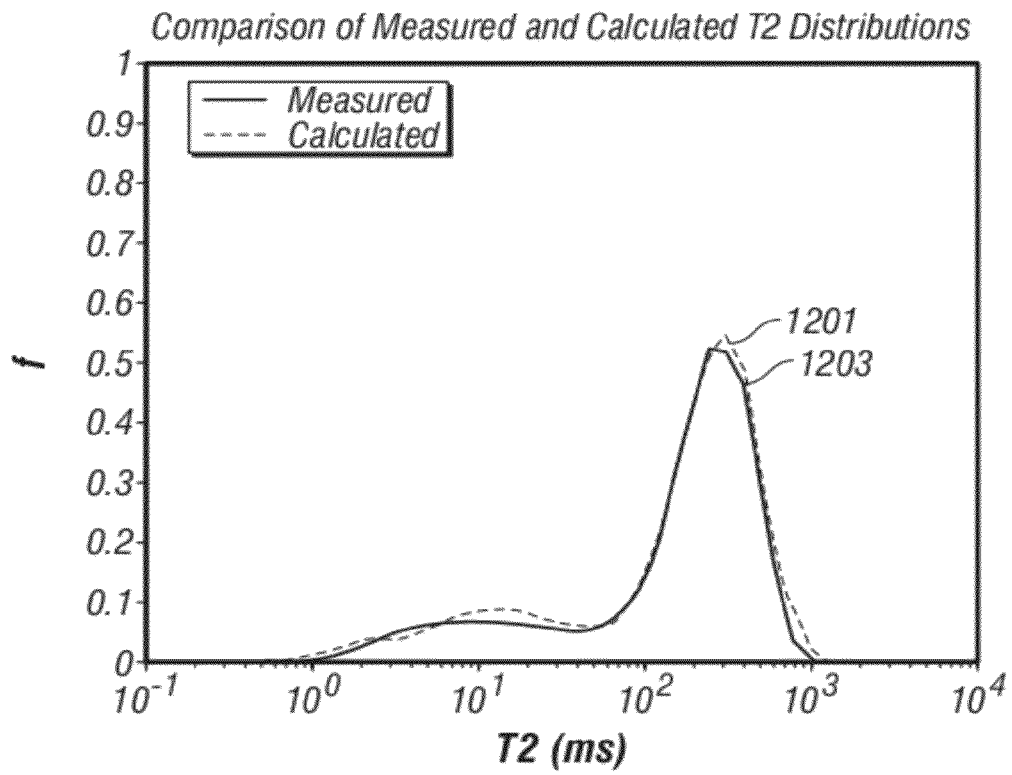
FIG. 12A, 12B shows comparison of calculated and measured $T_2$ distribution and measured and calculated grain size distributions for a quartz dominated sample.
Figure 12B:
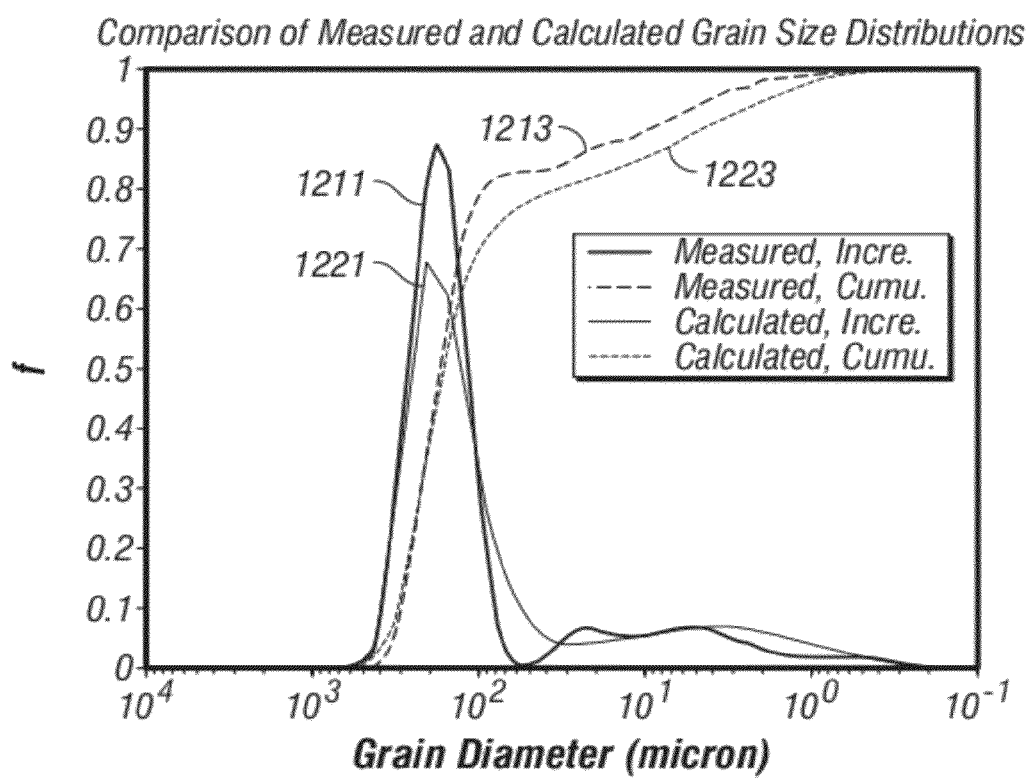

For the quartz dominated cores, the only required parameter in the determination of grain size distribution from $T_2$ is $(\rho_2 * R_S)$ (Eqs. (4) and (7)). As an example, FIG. 12A shows the comparison between the calculated and measured $T_2$ relaxation time distribution at 100% water saturation 1201, 1203. The agreement is excellent. FIG. 12B shows the measured 1211 and calculated grain size 1213 distributions and the cumulative measured 1221 and calculated grain size distribution 1223. Note that the calculated $T_2$ distribution is derived from the measured grain size distribution while the calculated grain size distribution is derived from the measured $T_2$ distribution. For this sample, $(\rho_2 * R_S) = 38$ μm/sec. For all the quartz dominated samples tested in this study, $(\rho_2 * R_S) = (33.7 \pm 6.5)$ μm/sec.

Figure 13A:
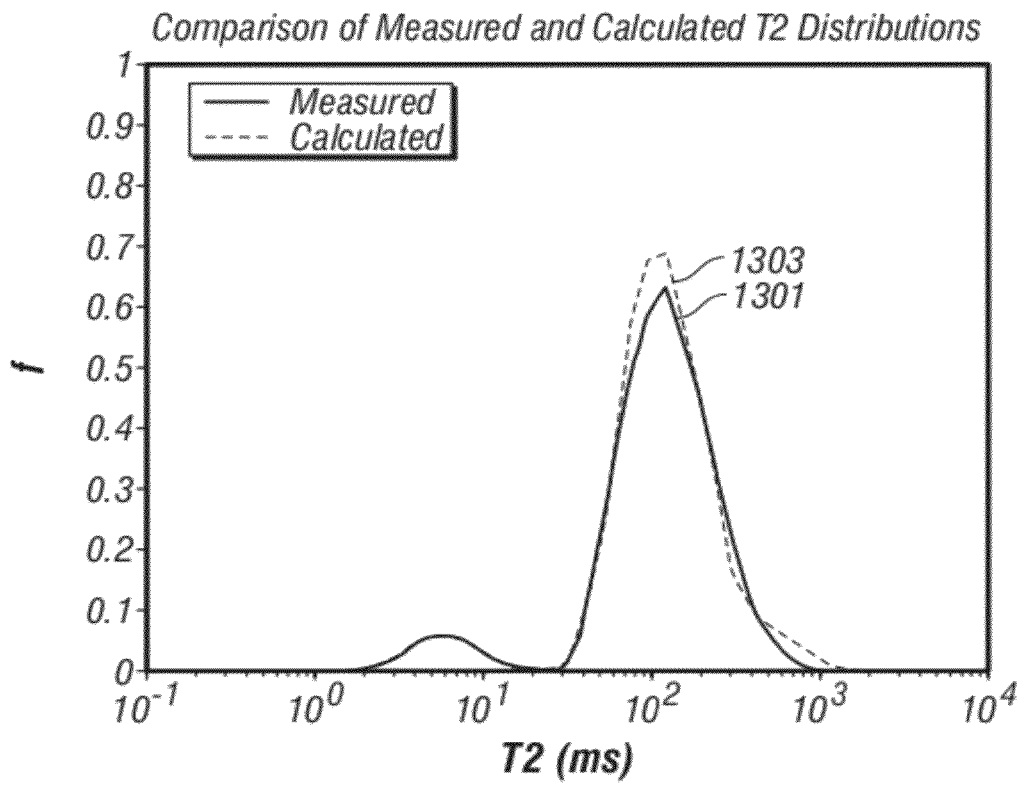
FIG. 13A, 13B shows comparison of calculated and measured $T_2$ distribution and measured and calculated grain size distributions for a sample that includes feldspar.
Figure 13B:
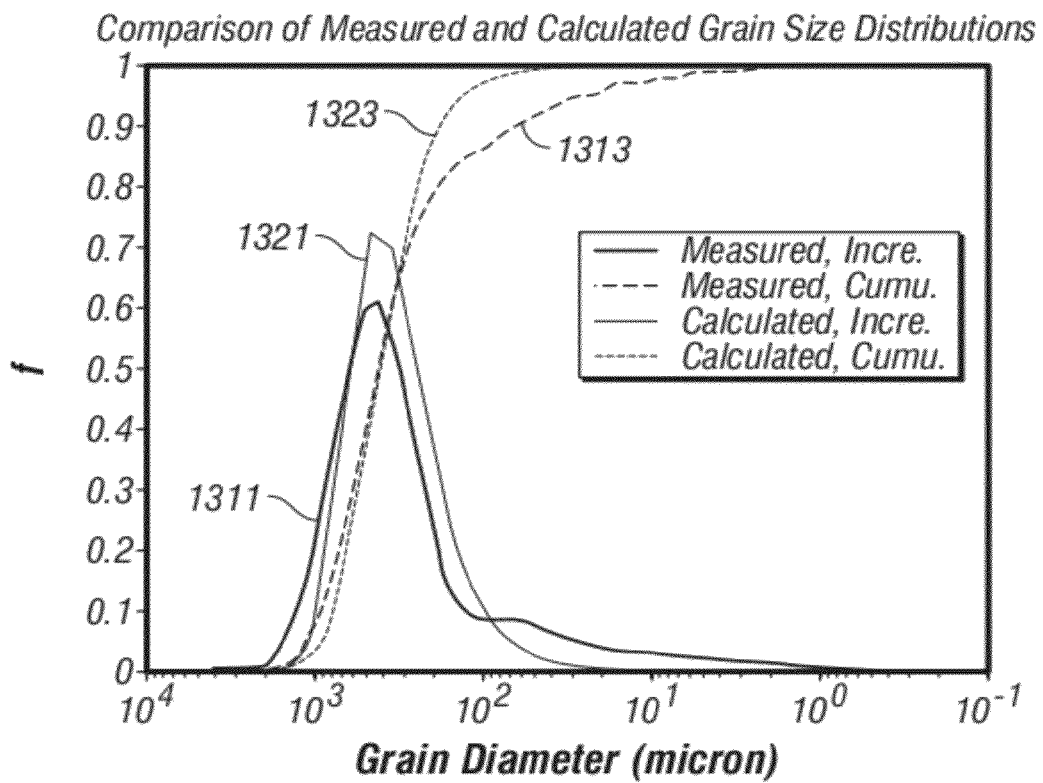
Figure 14A:
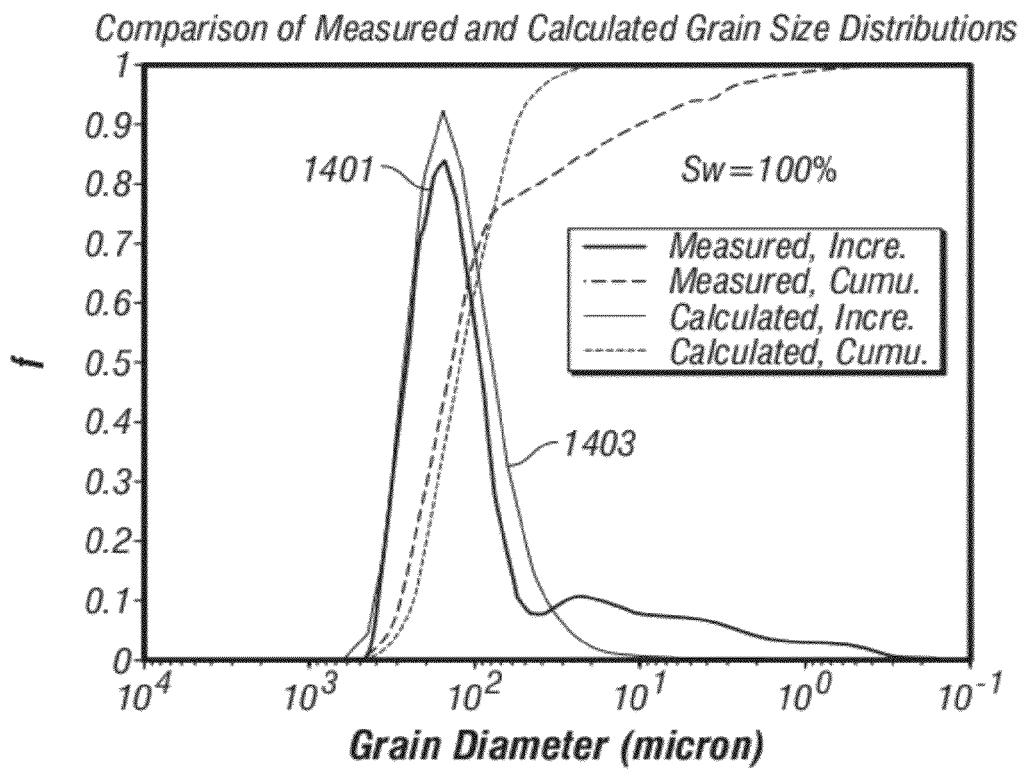
FIG. 14A, 14B, 14C, 14D shows grain size distributions and $T_2$ distributions for different water saturations.
Figure 14B:
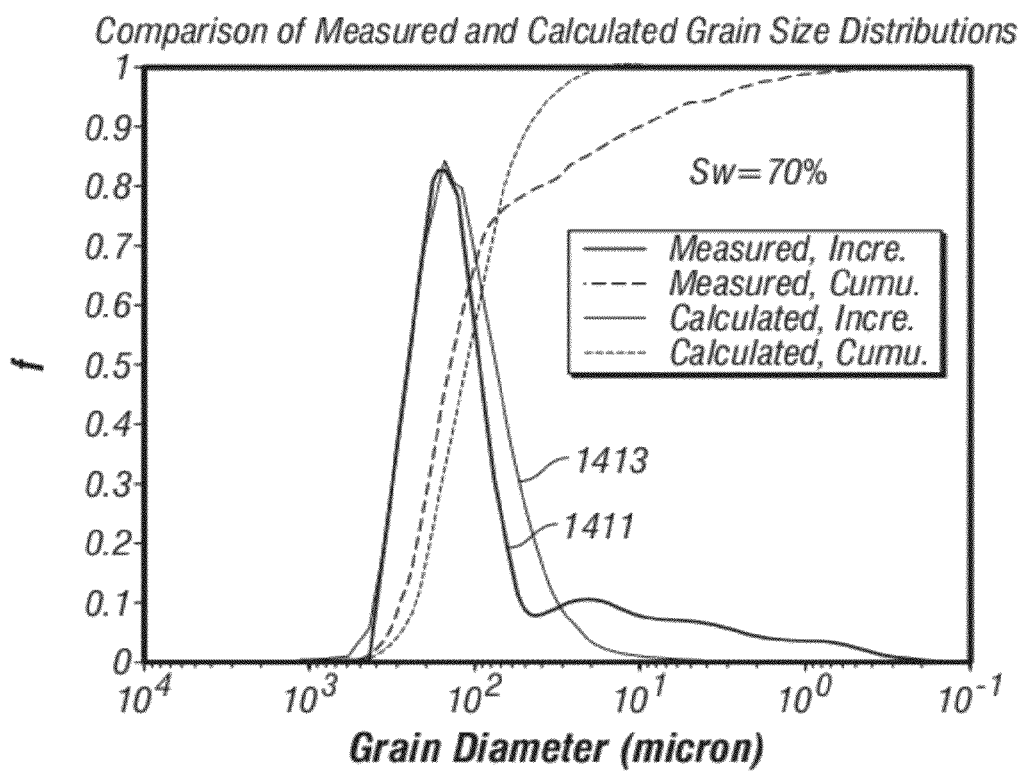
Figure 14C:
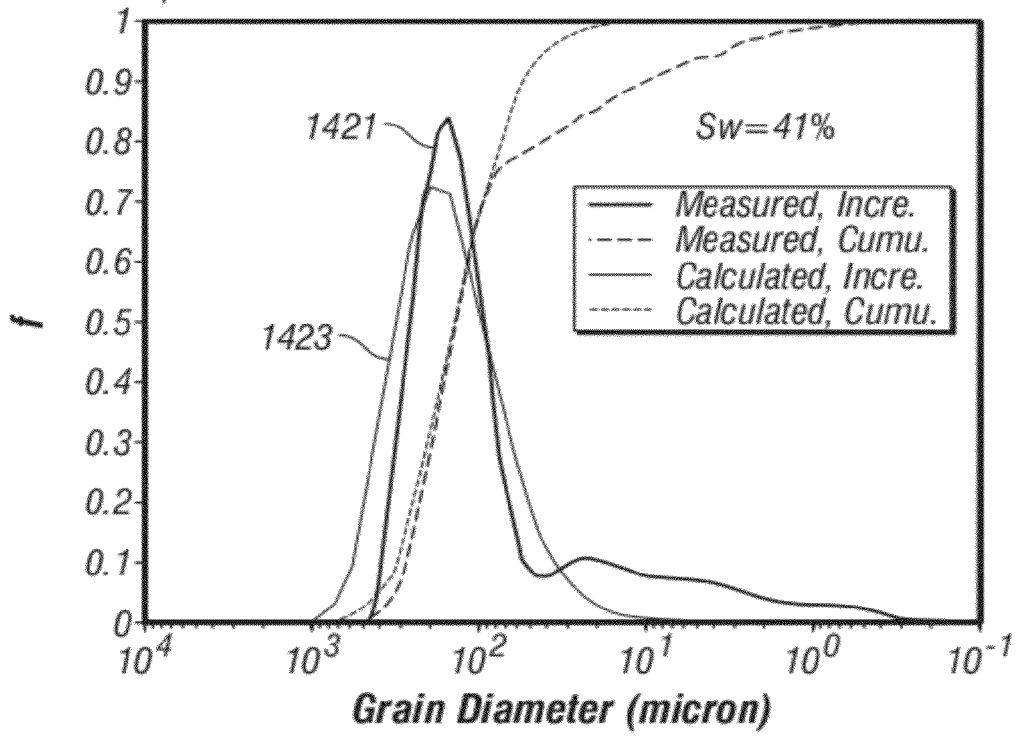
Figure 14D:
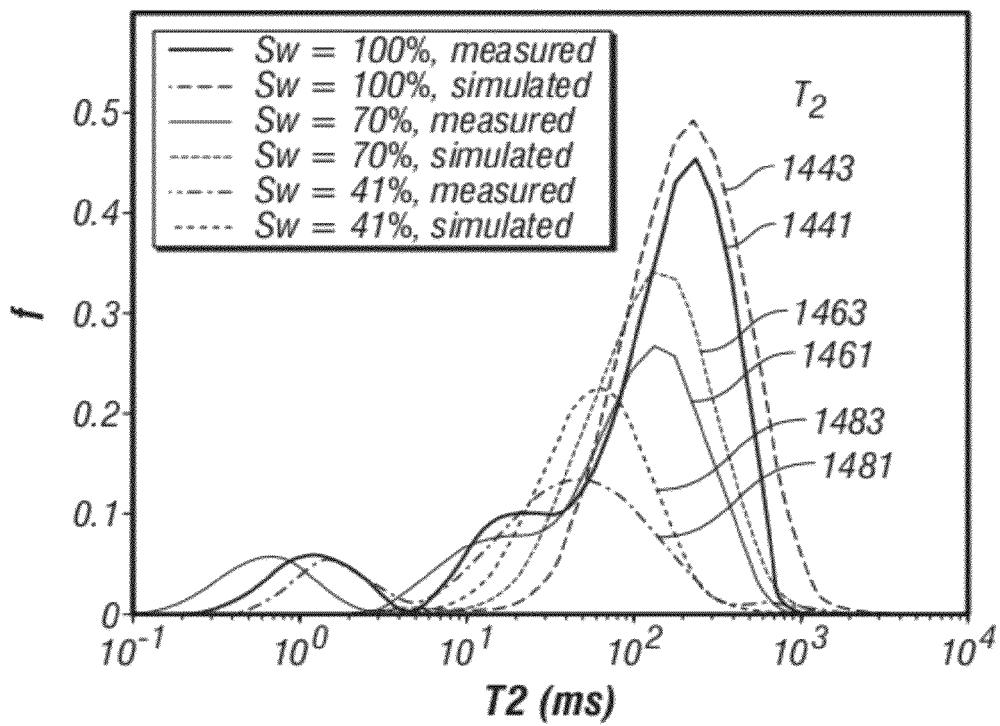

For the cores with a complex mineralogy of quartz and feldspar, the required parameters in the determination of grain size distribution from $T_2$ are $\rho_2$, $R_S$, and the mass percentage of quartz. Similar to FIG. 12A, FIG. 13A shows the comparison between the calculated and measured $T_2$ relaxation time distributions at 100% water saturation. FIG. 13B shows measured 1311 and calculated 1313 grain size distributions, and cumulative measured 1321 and calculated 1323 grain size distributions for sample BSS3. In this calculation, $\rho_2$ values for quartz and feldspar are 10 and 25 μm/sec; while $R_S$ for quartz and feldspar are 4 and 18, respectively.

FIG. 14 show some results for the determination of grain size distribution for cores under partial water saturation by the approach discussed with reference to FIG. 8. This is a quartz dominated core BSS10. Shown in FIG. 14A are the measured 1401 and calculated grain size distributions for $S_w = 100\%$. FIG. 14B shows the measured 1411 and calculated 1413 grain size distributions for $S_w = 70\%$, while FIG. 14C shows the measured 1421 and the calculated 1423 grain size distributions for $S_w = 41\%$. Two desaturation stages of 70% and 41% were reached for this core by centrifuging displacing of water under air. The saturation values are listed in each sub-plot. Similar to FIGS. 12 and 13, the measured and simulated $T_2$ relaxation time distributions are also shown in FIG. 14D. 1441 and 1443 correspond to 100% water saturation, 1561, 1563 to 70% water saturation, and 1581, 1583 to 41% water saturation. In the determination of the grain size distribution under partial water saturation, surface relaxivity and surface roughness factor are kept the same as that in the 100% water saturated case $((\rho_2 * R_S) = 33$ μm/sec).

Figure 15:
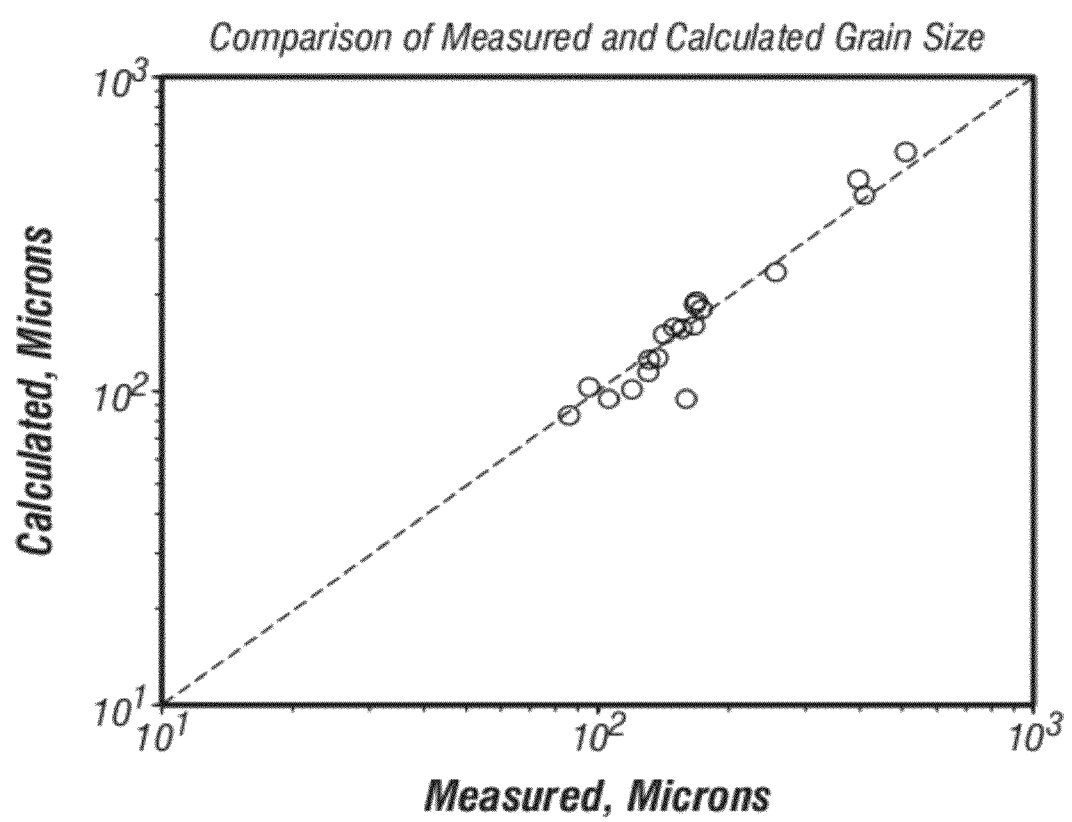
FIG. 15 shows a comparison of calculated and measured grain sizes.

FIG. 15 shows the comparison of measured and calculated grain size (mode value) for the total of 20 samples studied The abscissa is the modal value of the modal grain size and the ordinate is the modal value of the calculated grain size. Agreement is excellent.

Figure 16:
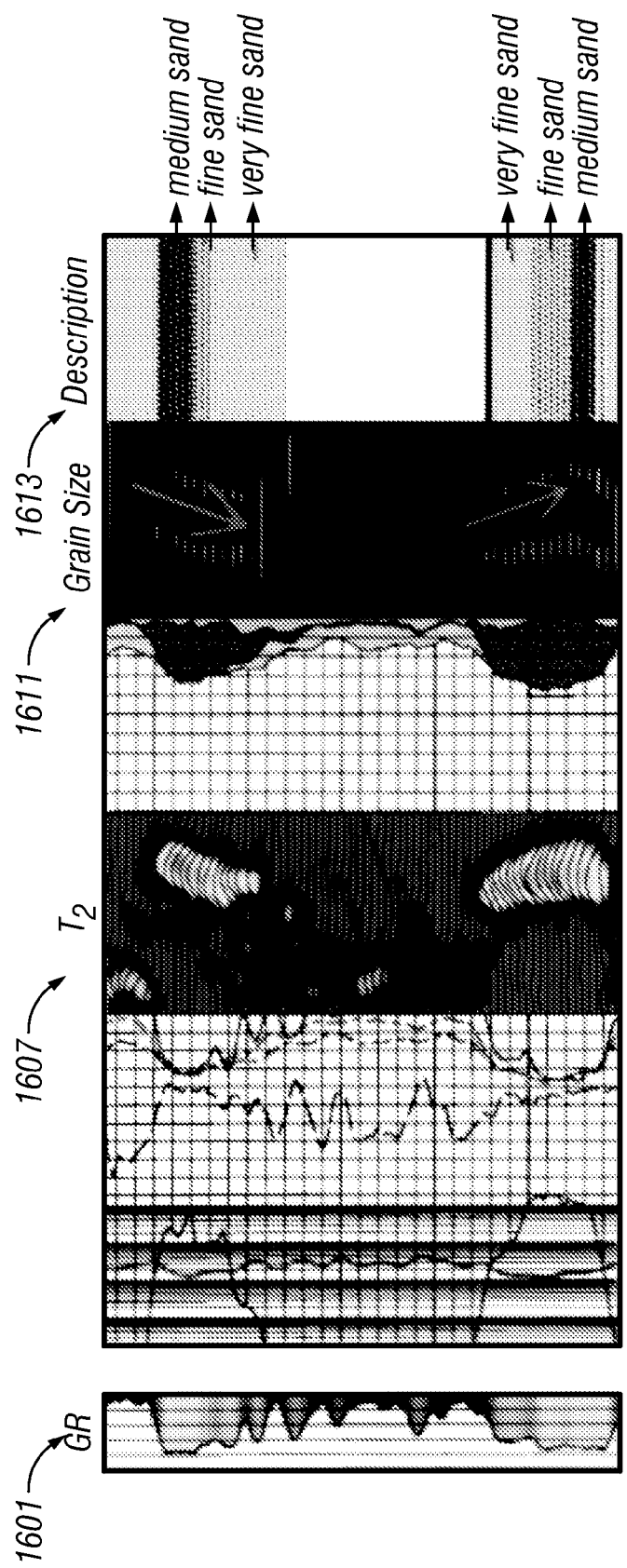
FIG. 16 (in color) is an exemplary display showing the results of processing of the NMR data.

Based on these core studies, a software module for the determination of grain size distribution was developed. The inputted NMR data come from log. It outputs the grain size distribution and a series of indexes for the general description of the grain sizes. The general description of the grain sizes include very coarse sand, coarse sand, medium sand, fine sand, very fine sand, coarse silt, and very fine silt. An example of the log interpretation of MREX data is shown in FIG. 16. 1601 is the gamma ray log, 1607 is the $T_2$ distribution derived from NMR data, 1611 is the grain size distribution and 1613 is a description of the sand. Notice in 1611 that the calculated grain size clearly shows a sequence of coarsening upward for the upper sand with grain sizes changing from medium sand to fine sand and to very fine sand; while the sequence for the lower sand is coarsening downward with grain sizes changing from very fine sand to medium sand and to medium sand. The sequences shown from the grain size determination agree with the GR curve.

Figure 17:
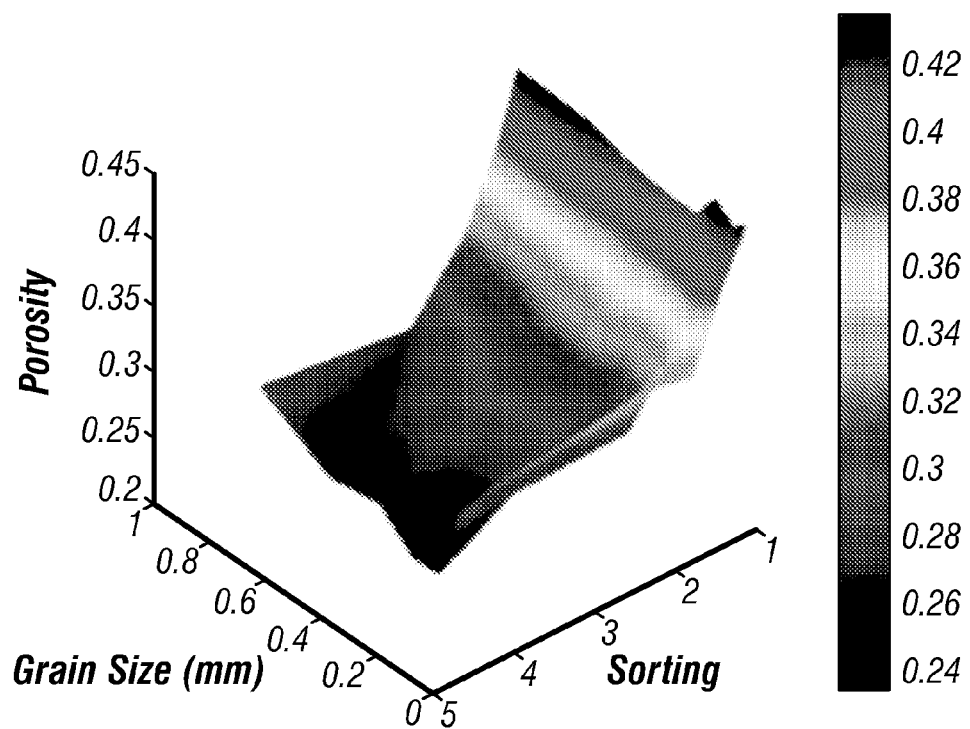
FIG. 17 (prior art, in color) shows the relation between porosity, grain size and sorting for a sandstone.

Another component of the present disclosure is the use of acoustic data in pore-scale modeling. Qualitatively, the effect of sorting on acoustic velocities is straightforward: as sorting becomes poorer, porosity decreases (smaller grains can accommodate in the pores surrounded by larger grains). See FIG. 17 (prior art) from G. Mavko, "*Seismic and Rockphysics Diagnostics of Multiscale Reservoir Textures*", DOE Report, Stanford University, 2004. But elastic properties do not change much because the sediment remains unconsolidated and grain-to-grain contacts are in fact point contacts (grains barely touch each other). On the other hand, for the formation having very good sorting, the same value of porosity as that of unconsolidated poorly sorted sediment would mean that the formation is compacted and/or cemented. This means that the decrease in porosity is accompanied by the increase in average grain contact area, and therefore stiffness of the grain skeleton, which leads to the increase of acoustic velocities.

Acoustic methods are widely used to investigate the properties of rocks. Seismic surveys are very important to hydrocarbon reservoir and aquifer exploration. Acoustic measurements are routinely performed in well logging, and measured elastic velocities are usually correlated with formation porosity. This method is one of the most widely used porosity estimates. The ability to predict acoustic (namely, compressional and shear) velocities in model rocks can not only improve the interpretation of logging data, but can also provide results for the independent assessment of constructed model rocks and developed methodology in general.

To predict acoustic velocities in the constructed model rocks, we use Eq. (11-18). We also specify the mineral composition of the model rock, namely, mass percentages of different minerals in the total mass of solid rock material. Using the elastic moduli of these mineral constituents, we compute the bulk and shear moduli of the composite multi-mineral rock matrix using Hashin-Shtrikman bounds for multiphase system $$K=0.5(K_{HS}^+ + K_{HS}^-); \mu=0.5(\mu_{HS}^+ + \mu_{HS}^-); \tag{11}$$

$$K_{HS}^+ = \Lambda(\mu_{max}), K_{HS}^- = \Lambda(\mu_{min}); \mu_{HS}^+ = \Gamma(\xi(K_{max}, \mu_{max}));$$
$$\mu_{HS}^- = \delta(\xi(K_{min}, \mu_{min})); \tag{12}$$

where:

$$\xi(K, \mu) = \frac{\mu}{6}\left(\frac{9K + 8\mu}{K + 2\mu}\right); \tag{13}$$

$$\Lambda(z) = \left(\sum_{i=1}^{N_{min}} \frac{m_i}{K_i + 4/3z}\right)^{-1} - \frac{4}{3}z; \tag{14}$$

$$\Gamma(z) = \left(\sum_{i=1}^{N_{min}} \frac{m_i}{\mu_i + z}\right)^{-1} - z.$$

where:

$N_{min}$=the total number of minerals in model rock $K_i$ and $\mu_i$=minerals' bulk and shear moduli, respectively $m_i$=mineral mass fractions in total mass of solid material Knowing the elastic moduli of the composite matrix, we apply Digby's grain contact theory to compute the elastic moduli of the model rock skeleton, as suggested by Bryant and Raikes when applied to sphere packings:

$$K_B = \frac{\mu Z(1-\phi)a}{3\pi R(1-\nu)}; \tag{15}$$

$$\mu_B = \frac{\mu Z(1-\phi)}{5\pi R}\left(\frac{a}{1-\nu} + \frac{3a}{2-\nu}\right),$$

where:

R=average grain radius

Z=average coordination number of grain contacts (average number of contacts per grain)

α=average cross sectional area of grain contacts at zero confining pressure

ν and μ=Poisson's ratio and bulk modulus of grain material, respectively

ϕ=porosity of model rock

We compute the average coordination number and average cross sectional area of grain contact directly from the pore geometric rock model, assuming that all porosity loss is due to overgrowth cementation.

Further, we use Gassmann's equations [30] to compute acoustic velocities in the model rock (dry and water-saturated):

$$V_p^{dry} = \sqrt{\frac{K_B + \frac{4}{3}\mu_B}{\rho_{dry}}} ; \tag{16}$$

$$V_s^{dry} = \sqrt{\frac{\mu_B}{\rho_{dry}}} ;$$

$$V_p^{sat} = \sqrt{\frac{K_{eff} + \frac{4}{3}\mu_{eff}}{\rho_{sat}}} ; \tag{17}$$

$$V_s^{sat} = \sqrt{\frac{\mu_{eff}}{\rho_{sat}}} ,$$

where:

$$K_{\mathit{eff}} = K_B + \frac{\left(1 - \frac{K_B}{K}\right)^2}{\frac{1-\phi}{K} + \frac{\phi}{K_W} - \frac{K_B}{K^2}}; \quad (18)$$

$$\mu_{\mathit{eff}} = \mu_B.$$

where:

$V_p$ and $V_s$=compressional and shear velocities, respectively $K_B$ and $\mu_B$=bulk and shear moduli of the rock skeleton K and $\mu$=bulk and shear moduli of the grain material (composite matrix)

$\phi$=porosity of model rock $K_W$=bulk modulus of water $\rho_{dry}$ and $\rho_{sat}$=densities of dry and water-saturated rock, respectively.

Figure 18:
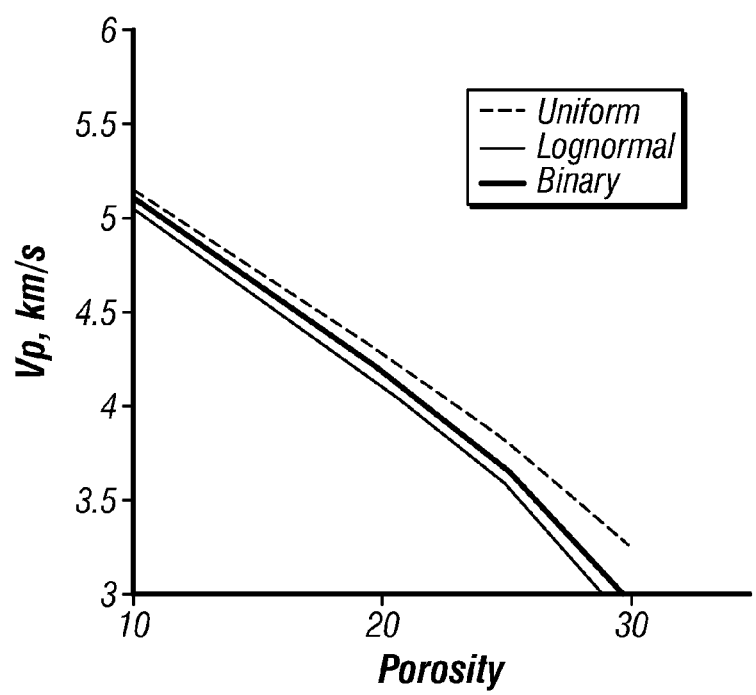
FIG. 18 shows compressional velocity for three different packings as a function of porosity.
Figure 19:
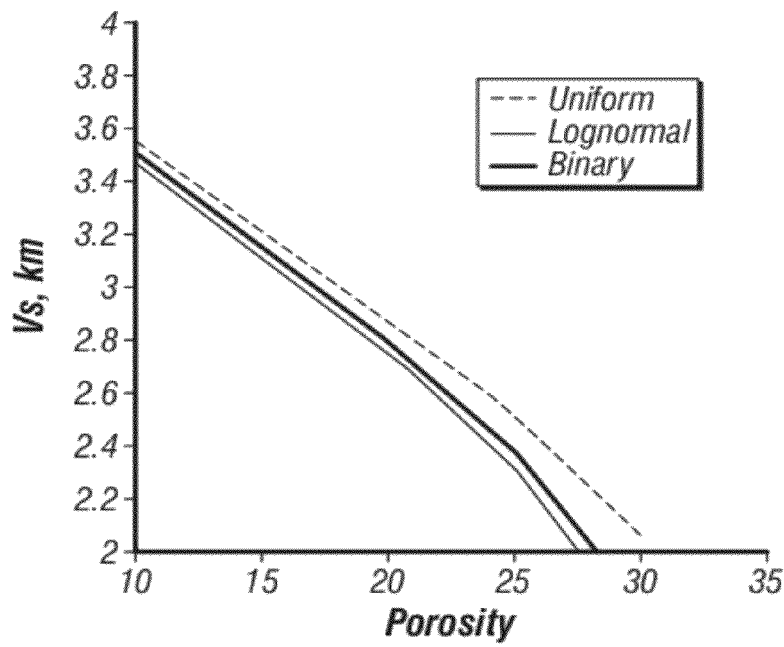
FIG. 19 shows shear velocity for three different packings as a function of porosity.

FIG. 18 shows compressional acoustic velocity in the three different packings as a function of porosity for overgrowth cement using the method above. Mean grain diameter is the same for all packings (200 μm). FIG. 19 shows compressional acoustic velocity in the three different packings as a function of porosity for overgrowth cement using the method above. Mean grain diameter is the same for all packings (200 μm). The difference between acoustic velocities of uniform (very good sorting) and lognormal (poor sorting) is significant (>0.1 km/s) for porosities higher than 20 pu and becomes small for lower values of porosity. However, it is the high porosity range that we are most interested to know grain size distribution (sand control in poorly consolidated formations). For low porosities, geomechanical properties of formation are controlled by the mechanical properties of cementation material.

Having now analyzed the effect of grain size distribution on NMR and acoustic properties, we are now in a position to go beyond the teachings of the various Georgi references. One embodiment comprises the method of using downhole logging measurements to determine formation grain size distribution. These measurements may be NMR relaxation time measurements or acoustic measurements. This has been discussed above. Another embodiment is a method for the calculation of grain size distribution from downhole logging data. This is based on using NMR relaxation time distribution ($T_1$ or $T_2$) to estimate mean grain size and compute total porosity. Further, compressional and shear acoustic velocities are used to compute sorting parameter. Since formation mineralogy affects both NMR and acoustic measurements, use is made of an estimated mineral reading from either a logging tool measuring lithology and mineralogy downhole, from drilling cuttings, or from prior knowledge based on core or logging data of a similar field. One embodiment is to use previously developed pore scale modeling algorithms for this purpose. However, the method is not limited by using pore scale modeling algorithms to establish relation between grain size distribution and logging data. It is possible to use empirical correlations, based, for example, on core analysis measurements, which will relate mean grain size to the NMR relaxation time spectrum and grain sorting—to acoustic velocities for rocks having different mineralogy. In this sense, we will talk about formation model rather than pore scale model, indicating that formation grain size distribution, mineralogy, and logging measurements are macroscopic formation properties. Based on the established relationships (either predictions from forward modeling or empirical correlations) between NMR properties, acoustic properties, formation mineralogy and grain size distribution parameters, acoustic and NMR downhole logging measurements can be used together to compute parameters of grain size distribution by minimizing misfit between the predictions and measured data.

Figure 20:
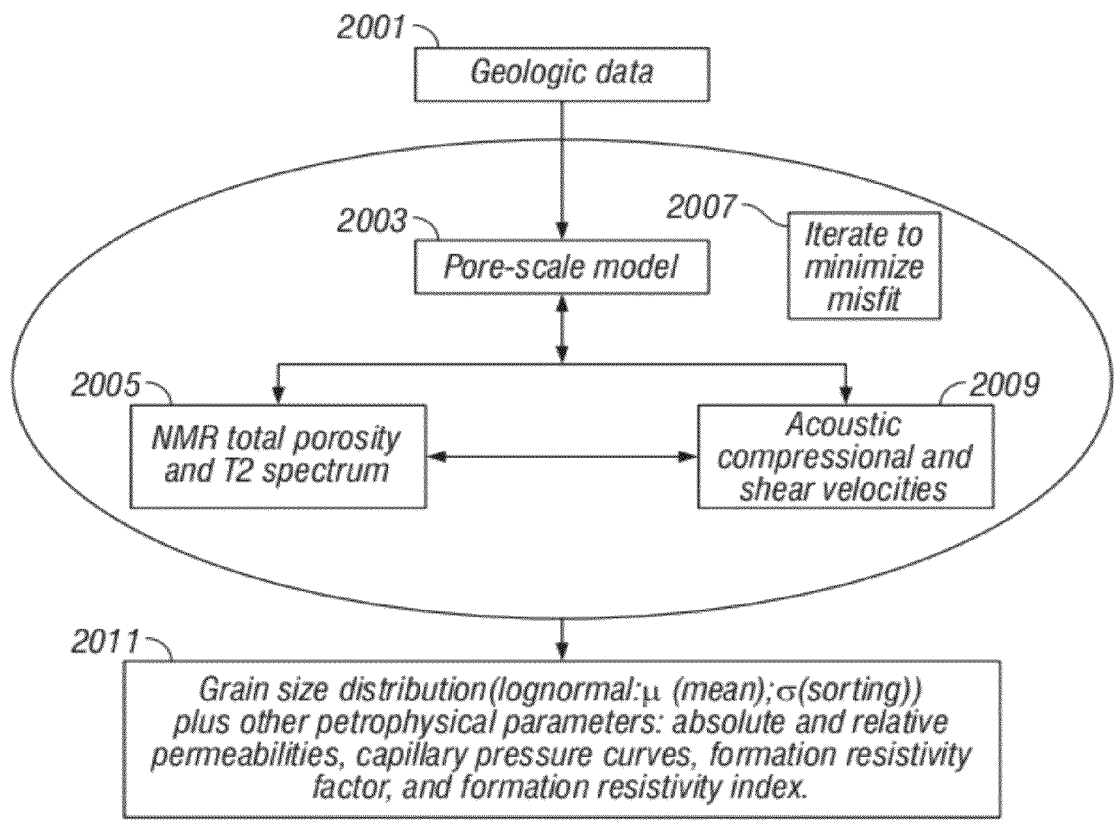
FIG. 20 shows a flow chart illustrating some of the steps of the disclosure.

FIG. 20 shows a flow chart illustrating the method. First, geologic data are specified 2001. Details of this are given below. Further, the pore scale model is constructed numerically 2003 based on this input as described in Georgi. Porosity may be determined independently by FE sensor, such as density sensor, or taken as NMR total porosity 2005. Initial grain size distribution of the model rock and the function that describes this distribution is specified as well. In one embodiment of the invention, grain size distribution of the model rock is taken to be lognormal with some initial values of mean grain size and standard deviation (sorting). Then acoustic and compressional velocities are computed in the model rock using grain contact theory of Digby 2009 as described above, including the case of multi-mineral composition of grain material, presence of clay minerals, and presence of two fluid phases, as well as the effect of confining pressure. NMR $T_2$ distribution of the wetting phase is also computed in a model rock as described in the Georgi references taking into account multi-mineral composition of grain material and presence of clay minerals discussed above. Fluid configurations in the pore space and their saturations are determined based on the pore scale modeling of capillary displacement process (drainage or imbibition), as described in the Georgi references. Misfit between the predictions (two acoustic velocities and each bin's amplitude in $T_2$ distribution) is calculated and some parameters of pore scale model (in the simplest case, only two grain size distribution parameters, mean and standard deviation; but in general these parameters may include porosity and mineralogical composition as well) are adjusted to reduce the misfit. This loop is iterated 2007 until the misfit is minimized and is less than the specified tolerance. As the measure of the misfit, $L_2$ norm (least squares) can be taken. This measure can also be modified to include weights for the different measurements (for example, acoustic velocities may be weighted more than NMR data).

The resulting grain size distribution 2011 and pore scale model is taken further as being representative of the formation, and other petrophysical parameters are computed in this model rock using pore scale modeling algorithms described in the Georgi references. These petrophysical parameters include absolute and relative permeabilities, capillary pressure curves, formation resistivity factor, and formation resistivity index.

The geologic data used may include:
1) Porosity (may be determined independently by FE sensor, such as density sensor or NMR sensor);
2) Amount of overgrowth cement (e.g. quartz);
3) Amount of pore filling cement (e.g. calcite);
   a) If pore filling cement occupies clusters of neighboring pores, operator must specify maximal number of pores in the cluster;
4) Type, amount and porosity of pore-filling clay;
5) Type, amount and porosity of pore-lining clay;
6) Wettability (value of contact angle) (not necessary when only one phase occupies pore space);
7) Water saturation (may be determined independently using downhole FE data, for example, NMR diffusivity contrast);
8) Direction of fluid displacement (i.e. drainage or imbibition; not necessary when only one phase occupies pore space);

9) If mineral composition is given as weight percentages via data from nuclear FE sensor, density of each mineral must be specified additionally;

10) If mineral composition is given as weight percentages via data from nuclear FE sensor, two elastic moduli (for example, bulk modulus and shear modulus) of each mineral must be specified additionally;

11) In case two fluid phases (i.e. water and oil, water and gas) occupy pore space, density and bulk modulus of each phase should be specified;

12) Overburden and pore pressures.

Once the pore-scale model has been determined, it may be used to determine additional formation properties. Georgi '490, for example, teaches the determination of a permeability, a formation factor, a S/V probability distribution function, a relation between capillary pressure and a fluid saturation, a relationship between relative permeability and a fluid saturation, a relative permeability of a non-wetting fluid phase in the earth formation, an end-point mobility of a fluid in the earth formation, and a permeability of a first fluid in the earth formation at an irreducible saturation of a second fluid in the earth formation.

The invention has been described above with reference to a device that is conveyed on a wireline into the borehole. The method of the invention may also be used with a logging device conveyed into a borehole on a tubular, such as a drillstring. The logging device may also be conveyed downhole on a slickline, the data stored in a suitable memory device and processed subsequent to retrieval of the slickline. The processing of the data may be done downhole using a downhole processor at a suitable location. It is also possible to store at least a part of the data downhole in a suitable memory device, in a compressed form if necessary. Upon subsequent retrieval of the memory device during tripping of the drillstring, the data may then be retrieved from the memory device and processed uphole.

Implicit in the control and processing of the data is the use of a computer program on a suitable machine readable medium that enables the processor to perform the control and processing. The machine readable medium may include ROMs, EPROMs, EEPROMs, Flash Memories and Optical disks.

What is claimed is:

1. A method of evaluating an earth formation, the method comprising:
   conveying at least one formation evaluation (FE) sensor in a borehole and
   making a measurement of a property of the earth formation, wherein the at least one FE sensor includes a first sensor responsive to a mean grain size and a second sensor responsive to a sorting parameter;
   using a processor for:
      defining a formation model including a distribution of grain sizes of the earth formation and a surface to volume ratio whose simulated output matches a value of the measurement, and
      using the defined formation model for estimating an additional property of the formation needed for managing a reservoir.

2. The method of claim 1 wherein the defining the formation model comprises defining a pore-scale model of the earth formation, the method further comprising recording the pore-scale model.

3. The method of claim 2 further comprising, for defining the pore-scale model, using geologic data selected from: (i) porosity, (ii) amount of overgrowth cement, (iii) amount of pore filling cement, (iv) type, amount and porosity of pore-filling clay; (v) type, amount and porosity of pore-lining clay; (vi) wettability, (vii) water saturation, (viii) direction of fluid displacement, (ix) mineral composition, and (x) density of fluids in a pore space.

4. The method of claim 2 wherein defining the pore-scale model further comprises at least one of (i) altering a size of the grains, (ii) adding a material other than a material of the grains to a pore space of the model, (iii) replacing a grain of the material with a different material, (iv) accounting for quartz overgrowth, (v) accounting for pore-filling dispersed shale, and (vi) accounting for compaction.

5. The method of claim 2 wherein the FE sensor is directionally sensitive and wherein defining the pore-scale model further comprises defining a plurality of different pore-scale models in different directions.

6. The method of claim 1 wherein the property is at least one of (i) porosity of the earth formation, (ii) a longitudinal relaxation time $T_1$ of the formation, (iii) a transverse relaxation time $T_2$ of the formation, (iv) a diffusivity of the formation, (v) a compressional velocity, and (vi) a shear velocity.

7. The method of claim 1 further comprising estimating the additional property from the group consisting of: (i) permeability, (ii) a formation factor, a (iii) S/V probability distribution function, (iv) a relation between capillary pressure and a fluid saturation, (v) a relationship between relative permeability and a fluid saturation, (vi) a relative permeability of a non-wetting fluid phase in the earth formation, (vii) an end-point mobility of a fluid in the earth formation, and (viii) a permeability of a first fluid in the earth formation at an irreducible saturation of a second fluid in the earth formation.

8. The method of claim 1 further characterizing the formation model by a mean value of the grain size and a sorting parameter.

9. An apparatus for evaluating an earth formation, the apparatus comprising:
   (a) at least one formation evaluation (FE) sensor configured to be conveyed in a borehole and make a measurement of a property of the earth formation, wherein the at least one FE sensor includes a first sensor responsive to a mean grain size and a second sensor responsive to a sorting parameter; and
   (b) a processor configured to:
      (I) define a formation model including a distribution of grain sizes of the earth formation and a surface to volume ratio whose output matches a value of the measurement, and
      (II) use the defined formation model for estimating an additional property of the formation needed for managing a reservoir.

10. The apparatus of claim 9 wherein the processor is further configured to define the formation model by defining a pore-scale model.

11. The apparatus of claim 10 wherein the processor is further configured to define the model using geologic data selected from: (i) porosity, (ii) amount of overgrowth cement, (iii) amount of pore filling cement, (iv) type, amount and porosity of pore-filling clay; (v) type, amount and porosity of pore-lining clay;
   (vi) wettability, (vii) water saturation, (viii) direction of fluid displacement, (ix) mineral composition, and (x) density of fluids in a pore space.

12. The apparatus of claim 11 wherein the first sensor comprises an NMR sensor and a second sensor comprises an acoustic sensor.

13. The apparatus of claim 10 wherein the processor is further configured to define the pore-scale model by at least one of (i) altering a size of the grains, (ii) adding a material other than a material of the grains to a pore space of the model, (iii) replacing a grain of the material with a different material, (iv) accounting for quartz overgrowth, (v) accounting for pore-filling dispersed shale, and (vi) accounting for compaction.

14. The apparatus of claim 10 wherein the at least one FE sensor is directionally sensitive and wherein the processor is further configured to define the pore-scale model by defining a plurality of different pore-scale models in different directions.

15. The apparatus of claim 9 wherein the FE sensor is selected from: (i) a porosity sensor, (ii) a nuclear magnetic resonance sensor, and (iii) an acoustic sensor.

16. The apparatus of claim 9 wherein the processor is further configured to estimate the-additional property from the group consisting of: (i) permeability, (ii) a formation factor, a (iii) S/V probability distribution function, (iv) a relation between capillary pressure and a fluid saturation, (v) a relationship between relative permeability and a fluid saturation, (vi) a relative permeability of a non-wetting fluid phase in the earth formation, (vii) an end-point mobility of a fluid in the earth formation, and (viii) a permeability of a first fluid in the earth formation at an irreducible saturation of a second fluid in the earth formation.

17. The apparatus of claim 9 wherein the processor is further configured to characterize the pore-scale model by a mean value of the grain size and a sorting parameter.

18. The apparatus of claim 9 wherein the at least one FE sensor is configured to be carried on a downhole assembly, the apparatus further comprising a conveyance device selected from (i) a wireline, (ii) a drilling tubular, and (iii) a slickline.

19. A non-transitory computer readable medium product having
instructions there on that when read by a processor cause the processor to execute a method, the method comprising:
defining a formation model including a distribution of grain sizes of the earth formation and a surface to volume ratio whose output matches a value-of a measurement of a property of an earth formation made by at least one formation evaluation (FE) sensor conveyed in a borehole, wherein the at least one FE sensor includes a first sensor responsive to a mean grain size and a second sensor responsive to a sorting parameter, and
using the defined formation model for estimating an additional property of the formation needed for managing a reservoir.

20. The non-transitory computer readable medium product of claim 19 further comprising at least one of (i) a ROM, (ii) an EPROM, (iii) an EAROM, (iv) a Flash Memory, and (v) an Optical disk.

* * * * *